US008535556B2

(12) United States Patent
Leck et al.

(10) Patent No.: US 8,535,556 B2
(45) Date of Patent: *Sep. 17, 2013

(54) COMPOSITIONS COMPRISING IODOTRIFLUOROMETHANE AND STABILIZERS

(75) Inventors: Thomas J. Leck, Hockessin, DE (US); Nandini C. Mouli, Reisterstown, MD (US); Jon Lee Howell, Bear, DE (US); Velliyur Nott Mallikarjuna Rao, Wilmington, DE (US); Andrew Edward Feiring, Wilmington, DE (US); Viacheslav A. Petrov, Hockessin, DE (US); Allen Capron Sievert, Elkton, MD (US); Mario Joseph Nappa, Newark, DE (US); Barbara Haviland Minor, Elkton, MD (US); Ekaterina N. Swearingen, Wilmington, DE (US); Schmitz Corneille, Aywaille (BE); Deepak Perti, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 670 days.

This patent is subject to a terminal disclaimer.

(21) Appl. No.: 12/161,842

(22) PCT Filed: Mar. 26, 2007

(86) PCT No.: PCT/US2007/007477
§ 371 (c)(1),
(2), (4) Date: Sep. 21, 2010

(87) PCT Pub. No.: WO2007/126760
PCT Pub. Date: Nov. 8, 2007

(65) Prior Publication Data
US 2011/0037017 A1    Feb. 17, 2011

Related U.S. Application Data

(60) Provisional application No. 60/788,229, filed on Mar. 30, 2006, provisional application No. 60/788,369, filed on Mar. 30, 2006, provisional application No. 60/787,911, filed on Mar. 30, 2006, provisional application No. 60/788,432, filed on Mar. 30, 2006, provisional application No. 60/788,371, filed on Mar. 30, 2006, provisional application No. 60/788,223, filed on Mar. 30, 2006, provisional application No. 60/788,376, filed on Mar. 30, 2006, provisional application No. 60/788,428, filed on Mar. 30, 2006, provisional application No. 60/788,128, filed on Mar. 30, 2006, provisional application No. 60/788,486, filed on Mar. 30, 2006, provisional application No. 60/787,935, filed on Mar. 30, 2006, provisional application No. 60/788,228, filed on Mar. 30, 2006, provisional application No. 60/788,375, filed on Mar. 30, 2006, provisional application No. 60/788,372, filed on Mar. 30, 2006, provisional application No. 60/787,914, filed on Mar. 30, 2006, provisional application No. 60/788,555, filed on Mar. 30, 2006, provisional application No. 60/788,437, filed on Mar. 30, 2006, provisional application No. 60/788,541, filed on Mar. 30, 2006, provisional application No. 60/788,374, filed on Mar. 6, 2006, provisional application No. 60/788,024, filed on Mar. 30, 2006, provisional application No. 60/787,913, filed on Mar. 30, 2006, provisional application No. 60/787,912, filed on Mar. 30, 2006, provisional application No. 60/787,933, filed on Mar. 30, 2006, provisional application No. 60/788,429, filed on Mar. 30, 2006, provisional application No. 60/788,542, filed on Mar. 30, 2006.

(51) Int. Cl.
*C09K 5/04* (2006.01)

(52) U.S. Cl.
USPC .............................................. 252/68; 252/67

(58) Field of Classification Search
USPC ........................................................ 252/67, 68
See application file for complete search history.

(56) References Cited

U.S. PATENT DOCUMENTS

| | | | |
|---|---|---|---|
| 6,969,701 B2 | 11/2005 | Singh et al. | |
| 8,075,796 B2 * | 12/2011 | Rao et al. | 252/67 |
| 8,097,181 B2 * | 1/2012 | Leck et al. | 252/67 |
| 2004/0147415 A1 * | 7/2004 | Brown et al. | 508/365 |
| 2005/0029488 A1 * | 2/2005 | Li et al. | 252/68 |
| 2006/0022166 A1 | 2/2006 | Wilson et al. | |
| 2006/0033072 A1 | 2/2006 | Wilson et al. | |
| 2006/0043330 A1 | 3/2006 | Wilson et al. | |
| 2006/0197053 A1 * | 9/2006 | Shiflett et al. | 252/67 |
| 2006/0269484 A1 * | 11/2006 | Knopeck et al. | 424/45 |

FOREIGN PATENT DOCUMENTS

| | | |
|---|---|---|
| JP | 2000309789 A | 11/2000 |
| JP | 2000309791 A | 11/2000 |
| WO | 2005/103187 A1 | 11/2005 |
| WO | 2006/069362 A2 | 6/2006 |
| WO | 2006/069362 A3 | 6/2006 |

OTHER PUBLICATIONS

PCT Written Opinion of the International Searching Authority.

* cited by examiner

*Primary Examiner* — John Hardee

(57) ABSTRACT

The present invention relates to compositions comprising iodotrifluoromethane and an effective amount of at least one stabilizer selected from the group consisting of hindered phenols, thiophosphates, butylated triphenylphosphorothionates, organo phosphates, phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephalic acid, diphenyl terephalic acid, ionic liquids, and mixtures thereof. These stabilized iodotrifluoromethane compositions may be useful as working fluids in multiple applications including cooling apparatus, such as refrigeration, air-conditioning, chillers, and heat pumps.

19 Claims, No Drawings

COMPOSITIONS COMPRISING IODOTRIFLUOROMETHANE AND STABILIZERS

This application represents a national filing under 35 U.S.C. 371 of International Application No. PCT/US07/07477 filed Mar. 26, 2007, and claims priority of U.S. Provisional Application Nos. 60/788,369, 60/787,911, 60/788,432, 60/788,371, 60/788,223, 60/788,376, 60/788,428, 60/788,128, 60/788,486, 60/787,935, 60/788,228, 60/788,375, 60/788,372, 60/787,914, 60/788,555, 60/788,437, 60/788,541, 60/788,374, 60/788,024, 60/787,913, 60/787,912, 60/787,933, 60/788,429, 60/788,542,all filed Mar. 30, 2006.

BACKGROUND OF THE INVENTION

1. Field of the Invention

The present invention relates to compositions comprising iodotrifluoromethane and at least one stabilizer. The stabilized compositions may be useful in cooling systems as replacements for existing working fluids with higher global warming potential.

2. Description of Related Art

New environmental regulations on refrigerants have forced the refrigeration and air-conditioning industry to look for new refrigerants with low global warming potential (GWP).

Replacement refrigerants (and other working fluids) are being sought that have low GWP, low toxicity, non-flammability, reasonable cost and excellent performance.

Iodotrifluoromethane ($CF_3I$) has been proposed as a refrigerant, alone or in mixtures. To prevent possible instability of the iodotrifluoromethane at the extremes of system operation (especially at high temperatures), it is desirable to add specific compounds that increase the stability (e.g., stabilizers) of iodotrifluoromethane in refrigeration, air-conditioning, and heat pump systems and the like.

The present invention provides a stabilized composition comprising at least one fluoroiodide that may be useful as a low GWP working fluid or refrigerant.

SUMMARY OF THE INVENTION

The present disclosure provides a composition comprising iodotrifluoromethane and an effective amount of at least one stabilizer selected from the group consisting of phenols, thiophosphates, butylated triphenylphosphorothionates, organo phosphates, phosphites, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalatic acid, ionic liquids, and mixtures thereof.

DETAILED DESCRIPTION OF THE INVENTION

The present invention provides a composition comprising iodotrifluoromethane and an effective amount of at least one stabilizer.

These compositions have a variety of utilities in working fluids, which include use as foaming agents, blowing agents, fire extinguishing agents, heat transfer mediums (such as heat transfer fluids and refrigerants for use in refrigeration systems, refrigerators, air conditioning systems, heat pumps, chillers, and the like), to name a few.

A heat transfer fluid (also referred to herein as a heat transfer composition or heat transfer fluid composition) is a working fluid used to carry heat from a heat source to a heat sink.

A refrigerant is a compound or mixture of compounds that function as a heat transfer fluid in a cycle wherein the fluid undergoes a phase change from a liquid to a gas and back.

Iodotrifluoromethane (also known as trifluoromethyl iodide or $CF_3I$) is commercially available from various sources or may be prepared by methods known in the art.

It is known in the art that iodotrifluoromethane can undergo degradation by any of various mechanisms (e.g., due to exposure to high temperature) or when in contact with other substances (e.g., moisture or oxygen) that may be present in a particular use and/or application. Such degradation may occur when iodotrifluoromethane is utilized as a refrigerant or heat transfer fluid. In certain embodiments, the degradation may be caused by instability of the compounds at extreme temperatures. In another embodiment, degradation may be caused by reaction with oxygen present in air that is inadvertently allowed into a system containing iodotrifluoromethane. Whatever reaction pathway that may be responsible for the degradation, certain stabilizer compounds have been discovered that reduce the degradation to an extent that make the use of iodotrifluoromethane as working fluid in, for instance, refrigeration, air-conditioning, and heat pumps or as refrigerants or heat transfer fluids possible.

The present invention provides compositions comprising iodotrifluoromethane and at least one stabilizer selected from the group consisting of phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephalic acid, diphenyl terephalic acid, ionic liquids, and mixtures thereof.

In one embodiment the stabilizers of the present invention comprise hindered phenols. Hindered phenol stabilizers are any substituted phenol compound including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thio-bis(2-methyl-6-tert-butylphenol); 4,4'-thiobis(3-methyl-6-tertbutylphenol); 2,2'-thiobis(4-methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol; 2,2'-methylenebis(4-methyl-6-cyclohexylphenol, 2,2- or 4,4-biphenyldiols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tert-butylbenzyl)sulfide; bis(3,5-di-tert-butyl-4-hydroxybenzyl) sulfide; and the like.

In another embodiment, the stabilizers of the present invention comprise at least one phosphorus containing compound.

The phosphorus containing compounds may include thiophosphates, butylated triphenylphosphorothionates, organophosphates, or phosphites.

In one embodiment, the stabilizers of the present invention comprise at least one thiophosphate. The thiophosphate stabilizers of the present invention are compounds derived from phosphoric acids by substituting divalent sulfur for one or more oxygen atoms. These may be monothiophosphates, dithiophosphates or higher order. A representative dithiophosphate is Irgalube® 63 (Ciba Specialty Chemicals, Basel, Switzerland). In another embodiment, thiophosphates include dialkylthiophosphate esters. A representative dialkylthiophosphate ester stabilizer is Irgalube® 353 (Ciba), a dialkyl dithiophosphate ester, and Irgalube® 350 (Ciba).

In another embodiment the stabilizers of the present invention comprise at least one butylated triphenylphosphorothionate as depicted by Formula 1.

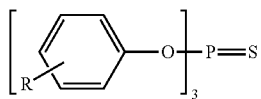

Formula 1

A butylated triphenylphosphorothionate, wherein each R is independently selected from H or tert-butyl. is Irgalube® 232 (Ciba).

In another embodiment the stabilizers of the present invention comprise at least one organophosphate. The organophosphate stabilizers include but are not limited to amine phosphates, trialkyl phosphates, triaryl phosphates, mixed alkyl-aryl phosphates (alkyldiaryl, dialkylaryl or alkylated aryl), and cyclic phosphates. A representative amine phosphate is Irgalube® 349 (Ciba). Representative trialkyl phosphates include: trimethyl phosphate (($CH_3$)$_3PO_4$, CAS reg. no. 512-56-1); triethyl phosphate (($CH_3CH_2$)$_3PO_4$, CAS reg. no. 78-40-0); tributyl phosphate (($C_4H_9$)$_3PO_4$, CAS reg. no. 126-73-8); trioctyl phosphate (($C_8H_{17}$)$_3PO_4$, CAS reg. no. 1806-54-8); and tri(2-ethylhexyl)phosphate (($CH_3CH(C_2H_5)(CH_2)_4$)$_3PO_4$, CAS reg. no. 78-42-2). Representative triaryl phosphates include: triphenyl phosphate (($C_6H_5O$)$_3PO$, CAS reg. no. 115-86-6); tricresyl phosphate (TCP, ($CH_3C_6H_4O$)$_3$PO, CAS reg. no. 1330-78-5); and trixylenyl phosphate ((($CH_3$)$_2C_6H_3O$)$_3PO$, CAS reg. no. 25155-23-1). Representative mixed alkyl-aryl phosphates include: isopropylphenyl phenyl phosphate (IPPP, ($C_6H_5O$)$_2$(($CH_3$)$_2$CHO)PO, CAS reg. no. 68782-95-6) and bis(t-butylphenyl)phenyl phosphate (TBPP, ($C_6H_5O$)$_2$(($CH_3$)$_3C$)PO, CAS reg. no. 65652-41-7). Such phosphorus compounds are available from multiple chemical suppliers such as Aldrich (Milwaukee, Wis.); Alfa Aesar (Ward Hill, Mass.); or Akzo Nobel (Arnhem, the Netherlands). Additional representative phosphorus compounds are Syn-O-Ad 8784, a butylated triphenyl phosphate from Akzo Nobel (Arnhem, the Netherlands); Durad 620, a tert-butylated triphenyl phosphate from Great Lakes Chemical Corporation (GLCC, West Lafayette, Ind.); and Durad 220 and 110, iso-propylated triphenyl phosphates also from GLCC.

In another embodiment the stabilizers of the present invention may comprise at least one phosphite. Phosphite stabilizers may be derived from substituted phosphites. In particular, hindered phosphites are derivatives of alkyl, aryl or alkylaryl phosphite compounds. Representative hindered phosphites are Irgafos 168 (Tris-(di-tert-butylphenyl) phosphite), Irgafos OPH (Di-n-octyl phosphite), and Irgafos DDPP (Iso-decyl diphenyl phosphite) (all from Ciba).

In another embodiment the stabilizers of the present invention comprise at least one aryl alkyl ether. The aryl alkyl ether stabilizers of the present invention may be depicted by Formula 2, wherein n is 1, 2 or 3 and $R^1$ is an alkyl group of 1 to 16 carbon atoms.

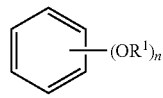

Formula 2

Representative aryl alkyl ethers include but are not limited to anisole, 1,4-dimethoxybenzene, 1,4-diethoxybenzene and 1,3,5-trimethoxybenzene.

In another embodiment, the stabilizers of the present invention comprise at least one terpene or terpenoid. Terpenes are hydrocarbon compounds characterized by structures containing more than one repeating isoprene (2-methyl-1,3-butadiene) unit. Representative terpenes include but are not limited to myrcene (2-methyl-6-methyl-eneocta-1,7-diene), allo-ocimene, beta-ocimene, terebene, limonene (in particular d-limonene), retinal, pinene, menthol, geraniol, farnesol, phytol, Vitamin A, terpinene, delta-3-carene, terpinolene, phellandrene, fenchene, dipentene, and mixtures thereof. Terpene stabilizers are commercially available or may be prepared by methods known in the art or isolated from natural sources.

Terpenoids are natural products and related compounds characterized by structures containing more than one repeating isoprene unit and usually contain oxygen. Representative terpenoids include carotenoids, such as lycopene (CAS reg. no. [502-65-8]), beta carotene (CAS reg. no. [7235-40-7]), and xanthophyls, i.e. zeaxanthin (CAS reg. no. [144-68-3]); retinoids, such as hepaxanthin (CAS reg. no. [512-39-0]), and isotretinoin (CAS reg. no. [4759-48-2]); abietane (CAS reg. no. [640-43-7]); ambrosane (CAS reg. no. [24749-18-6]); aristolane (CAS reg. no. [29788-49-6]); atisane (CAS reg. no. [24379-83-7]); beyerane (CAS reg. no. [2359-83-3]), bisabolane (CAS reg. no. [29799-19-7]); bornane (CAS reg. no. [464-15-3]); caryophyllane (CAS reg. no. [20479-00-9]); cedrane (CAS reg. no. [13567-54-9]); dammarane (CAS reg. no. [545-22-2]); drimane (CAS reg. no. [5951-58-6]); eremophilane (CAS reg. no. [3242-05-5]); eudesmane (CAS reg. no. [473-11-0]); fenchane (CAS reg. no. [6248-88-0]); gammacerane (CAS reg. no. [559-65-9]); germacrane (CAS reg. no. [645-10-3]); gibbane (CAS reg. no. [6902-95-0]); grayanotoxane (CAS reg. no. [39907-73-8]); guaiane (CAS reg. no. [489-80-5]); himachalane (CAS reg. no. [20479-45-2]); hopane (CAS reg. no. [471-62-5]); humulane (CAS reg. no. [430-19-3]); kaurane (CAS reg. no. [1573-40-6]); labdane (CAS reg. no. [561-90-0]); lanostane (CAS reg. no. [474-20-4]); lupane (CAS reg. no. [464-99-3]); p-menthane (CAS reg. no. [99-82-1]); oleanane (CAS reg. no. [471-67-0]); ophiobolane (CAS reg. no. [20098-65-1]); picrasane (CAS reg. no. [35732-97-9]); pimarane (CAS reg. no. [30257-03-5]); pinane (CAS reg. no. [473-55-2]); podocarpane (CAS reg. no. [471-78-3]); protostane (CAS reg. no. [70050-78-1]); rosane (CAS reg. no. [6812-82-4]); taxane (CAS reg. no. [1605-68-1]); thujane (CAS reg. no. [471-12-5]); trichothecane (CAS reg. no. [24706-08-9]); and ursane (CAS reg. no. [464-93-7]). The terpenoids of the present invention are commercially available or may be prepared by methods known in the art or may be isolated from the naturally occurring source.

In another embodiment the stabilizers of the present invention comprise at least one epoxide. Epoxides include 1,2- propylene oxide (CAS reg. no. [75-56-9]), 1,2-butylene oxide (CAS reg. no. [106-88-7]), butylphenylglycidyl ether, pentylphenylglycidyl ether, hexylphenylglycidyl ether, heptylphenylglycidyl ether, octylphenylglycidyl ether, nonylphenylglycidyl ether, decylphenylglycidyl ether, glycidyl methylphenylether, 1,4-glycidyl phenyl diether, 4-methoxyphenylglycidyl ether, naphthyl glycidyl ether, 1,4-diglycidyl naphthyl diether, butylphenyl glycidyl ether, n-butyl glycidyl ether, isobutyl glycidyl ether, hexanediol diglycidyl ether, allyl glycidyl ether, polypropylene glycol diglycidyl ether, and mixtures thereof.

In another embodiment, the epoxide stabilizers of the present invention comprise fluorinated epoxides. The fluorinated epoxide stabilizers of the present invention may be depicted by Formula 3, wherein each of $R^2$ through $R^5$ is H, alkyl of 1 to 6 carbon atoms or fluoroalkyl of 1 to 6 carbon atoms with the proviso that at least one of $R^2$ through $R^5$ is a fluoroalkyl group.

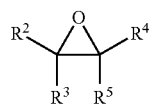

Formula 3

Representative fluorinated epoxide stabilizers include but are not limited to trifluoromethyloxirane and 1,1-bis(trifluoromethyl)oxirane. Such compounds may be prepared by methods known in the art, for instance by methods described in, *Journal of Fluorine Chemistry*, volume 24, pages 93-104 (1984), *Journal of Organic Chemistry*, volume 56, pages 3187 to 3189 (1991), and *Journal of Fluorine Chemistry*, volume 125, pages 99-105 (2004).

In another embodiment the stabilizers of the present invention comprise at least one oxetane. The oxetane stabilizers of the present invention may be a compound with one or more oxetane groups and is represented by Formula 4, wherein $R_1$-$R_6$ are the same or different and can be selected from hydrogen, alkyl or substituted alkyl, aryl or substituted aryl.

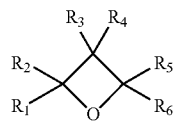

Formula 4

Representative oxetane stabilizers include but are not limited to 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); and 3-ethyl-3-((2-ethylhexyloxy)methyl)-oxetane, such as OXT-212 (Toagosei Co., Ltd).

In another embodiment the stabilizers of the present invention comprise ascorbic acid (CAS reg. no. [50-81-7]).

In another embodiment the stabilizers of the present invention comprise at least one thiol compound, also known as mercaptans or hydrosulfides. Such thiol compounds are the sulfur analogs of the hydroxyl group containing alcohols. Representative thiol stabilizers include but are not limited to methanethiol (methyl mercaptan), ethanethiol (ethyl mercaptan), Coenzyme A (CAS reg. no. [85-61-0]), dimercaptosuccinic acid (DMSA, CAS reg. no. [2418-14-6]), grapefruit mercaptan ((R)-2-(4-methylcyclohex-3-enyl)propane-2-thiol, CAS reg. no. [83150-78-1]), cysteine ((R)-2-amino-3-sulfanyl-propanoic acid, CAS reg. no. [52-90-4]), and lipoamide (1,2-dithiolane-3-pentanamide, CAS reg. no. [940-69-2].

In another embodiment the stabilizers of the present invention comprise at least one lactone. Lactones are cyclic esters that may be produced by the reaction of an alcohol group with a carboxylic acid group in the same molecule. Representative lactone stabilizers of the present invention include but are not limited to gamma-butyrolactone (CAS reg. no. [96-48-0]), delta-gluconolactone (CAS reg. no. [90-80-2]), gamma-undecalactone (CAS reg. no. [104-67-6]), 6,7-dihydro-4(5H)-benzofuranone (CAS reg. No. [16806-93-2]), and 5,7-bis(1,1-dimethylethyl)-3-[2,3(or 3,4)-dimethylphenyl]-2(3H)-benzofuranone (CAS reg. no [201815-03-4]) such as Irganox® HP-136 (Ciba).

In another embodiment the stabilizers of the present invention comprise at least one thioether. Thioether stabilizers of the present invention include but are not limited to benzyl phenyl sulfide (CAS reg. no. [831-91-4]), diphenyl sulfide (CAS reg. no. [139-66-2]), dioctadecyl 3,3'-thiodipropionate, such as Irganox® PS 802 (Ciba) and didodecyl 3,3'-thiopropionate, such as Irganox® PS 800 (Ciba).

In another embodiment the stabilizers of the present invention comprise at least one amine. In one embodiment the amine stabilizers comprise at least one compound selected from the group consisting of triethylamine, tributylamine, diisopropylamine, triisopropylamine, triisobutylamine, p-phenylenediamine, and diphenylamine. In another embodiment, the amine stabilizers comprise dialkylamines including (N-(1-methylethyl)-2-propylamine, CAS reg. no. [108-18-9]). In another embodiment the amine stabilizers include hindered amine antioxidants. Hindered amine antioxidants include amines derived from substituted piperidine compounds, in particular derivatives of an alkyl-substituted piperidyl, piperidinyl, piperazinone, or alkoxypiperidinyl compounds. Representative hindered amine antioxidants include 2,2,6,6-tetramethyl-4-piperidone; 2,2,6,6-tetramethyl-4-piperidinol; bis-(1,2,2,6,6-pentamethylpiperidyl)sebacate (CAS reg. no. [41556-26-7]); di-(2,2,6,6-tetramethyl-4-piperidyl) sebacate, such as Tinuvin® 770; poly-(N-hydroxyethyl-2,2,6,6-tetramethyl-4-hydroxy-piperidyl succinate (CAS reg. no. [65447-77-0]), such as Tinuvin® 622LD (Ciba); alkylated paraphenylenediamines, such as N-phenyl-N'-(1,3-dimethylbutyl)-p-phenylenediamine, or N,N'-di-sec-butyl-p-phenylenediamine; and hydroxylamines such as tallow amines, methyl bis tallow amine (CAS reg no. 204933-93-7) and bis tallow amine (CAS reg no. 14325-92-2) or phenol-alpha-naphthylamine. Some other hindered amine antioxidants include Tinuvin® 765 (Ciba), BLS® 1944 (Mayzo, Inc.), and BLS® 1770 (Mayzo).

In another embodiment the stabilizers of the present invention comprise nitromethane ($CH_3NO_2$, CAS reg. no. [75-52-5]).

In another embodiment the stabilizers of the present invention comprise at least one alkyl silane. Silanes are compounds similar to hydrocarbons wherein a silicon atom replaces each carbon. Alkyl silane stabilizers are silanes with at least one carbon based alkyl group attached to the silicon, and include but are not limited to bis(dimethylamino)methylsilane (DMAMS, CAS reg. no. [22705-33-5]), tris(trimethylsilyl) silane (TTMSS, CAS reg. no. [1873-77-4]), vinyltriethoxysilane (VTES, CAS reg. no. [78-08-0]), vinyltrimethoxysilane (VTMO, CAS reg. no. [2768-02-7]), and mixtures thereof.

In another embodiment, stabilizers of the present invention comprise at least one benzophenone derivative. Benzophenone derivative stabilizers comprise benzophenone that may be substituted with side-chain groups including halides, such as fluorine, chlorine, bromine or iodine, amino groups, hydroxyl groups, alkyl groups such as methyl, ethyl or propyl groups, aryl groups such as phenyl, nitro groups, or any combinations of such groups. Representative benzophenone derivative stabilizers include but are not limited to: 2,5-difluorobenzophenone; 2',5'-dihydroxyacetophenone; 2-aminobenzophenone; 2-chlorobenzophenone; 2-fluorobenzophenone; 2-hydroxybenzophenone; 2-methylbenzophenone; 2-amino-4'-chlorobenzophenone; 2-amino-4'-fluorobenzophenone; 2-amino-5-bromo-2'-chlorobenzophenone; 2-amino-5-chlorobenzophenone; 2-amino-5-chloro-2'-fluorobenzophenone; 2-amino-5-nitrobenzophenone; 2-amino-5-nitro-2'-chlorobenzophenone; 2-amino-2',5-dichlorobenzophenone; 2-chloro-4'-fluorobenzophenone; 2-hydroxy-4-methoxybenzophenone; 2-hydroxy-5-chlorobenzophenone; 2-methylamino-5-chlorobenzophenone; 3-methylbenzophenone; 3-nitrobenzophenone; 3-nitro-4'-chloro-4-fluorobenzophenone; 4-chlorobenzophenone; 4-fluorobenzophenone; 4-hydroxybenzophenone; 4-methoxybenzophenone; 4-methylbenzophenone; 4-nitrobenzophenone; 4-phenylbenzophenone; 4-chloro-3-nitrobenzophenone; 4-hydroxy-4'-chlorobenzophenone; 2,4-dihydroxybenzophenone; 2,4-dimethylbenzophenone; 2,5-dimethylbenzophenone; 3,4-diaminobenzophenone; 3,4-dichlorobenzophenone; 3,4-difluorobenzophenone; 3,4-dihydroxybenzophenone; 3,4-dimethylbenzophenone; 4,4'-bis(diethylamine)benzophenone; 4,4'-bis(dimethylamine) benzophenone; 4,4'-dichlorobenzophenone; 4,4'-difluorobenzophenone; 4,4'-dihydroxybenzophenone; 4,4'-dimethoxybenzophenone; and mixtures thereof.

In another embodiment the stabilizers of the present invention comprise at least one aryl sulfide. The aryl sulfide stabilizers comprise at least one selected from the group consisting of benzyl phenyl sulfide, diphenyl sulfide, dibenzyl sulfide, and mixtures thereof.

In another embodiment the stabilizers of the present invention comprise at least one selected from the group consisting of divinyl terephthalic acid (CAS reg. no. [13486-19-0]), diphenyl terephthalic acid (CAS reg. no. [1539-04-4]), and mixtures thereof.

In another embodiment, the stabilizers of the present invention comprise at least one ionic liquids. Ionic liquids are organic salts that are liquid at room temperature (approximately 25° C.). In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$, $[(CF_3SO_2)_2N]-$, $[(CF_3CF_2SO_2)_2N]-$, $[(CF_3SO_2)_3C]-$, $[CF_3CO_2]-$, and F—. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In another embodiment, the stabilizers of the present invention comprise at least one metal deactivator including but not limited to areoxalyl bis(benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetraacetic acid (CAS reg no. 60-00-4) and its salts.

Certain embodiments of the stabilizers of the present invention further comprise corrosion inhibitors including but not limited to dodecenyl succinic anhydride (DDSA), amine phosphate, oleoyl sarcosine, Imidazole derivatives and substituted sulphonates.

Certain embodiments of the stabilizers of the present invention further comprise triazole, benzotriazole, 2-mercaptobenzotriazole and mixtures thereof. such as N,N-disalicylidene-1,2-diaminopropane.

Certain embodiments of the stabilizers of the present invention further comprise multifunctional stabilizer compounds including but not limited to Irgalube® F10 and metal dialkyl dithiophosphates, including zinc dialkyl dithiophosphate (ZDDP) such as Lubrizol 1375.

Unless otherwise noted above, the stabilizers of the present invention are commercially available from various chemical supply houses.

Single stabilizer compounds may be used in combination in the present compositions comprising iodotrifluoromethane or multiple stabilizer compounds may be combined in any proportion to serve as a stabilizer blend. The stabilizer blend may contain multiple stabilizer compounds from the same class of compounds or multiple stabilizer compounds from different classes of compounds. For example, a stabilizer blend may contain 2 or more hindered phenols, or one or more hindered phenols in combination with one or more amines.

Additionally, some of the stabilizer compounds exist as multiple configurational isomers or stereoisomers. Single isomers or multiple isomers of the same compound may be used in any proportion to prepare the stabilizer blend. Further, single or multiple isomers of a given compound may be combined in any proportion with any number of other compounds to serve as a stabilizer blend. The present invention is intended to include all single configurational isomers, single stereoisomers or any combination or mixture thereof.

Of particular note are stabilizer compositions comprising combinations of compounds that provide an unexpected level of stabilization. Certain of these combinations may serve as synergistic stabilizer compositions that augment each others' efficiency in a formulation and the stabilization obtained is larger than that expected from the sum of the contributions of the individual components.

In one embodiment, the present stabilizer compositions comprise phenols and phosphites. In another embodiment, the present stabilizer compositions comprise phenols and amines. In another embodiment, the present stabilizer compositions comprise phenols and ionic liquids.

The present invention further provides a composition comprising iodotrifluoromethane and a stabilizer composition as defined herein above.

In one embodiment phenols for inclusion in the present stabilizer compositions may be any of substituted phenol, in particular derivatives of alkyl or aryl phenolic compounds. Representative hindered phenols are Irganox E201, (di-alpha-tocophenol), Irganox 1010, Irganox 1976, Irganox L 109, Irganox L 134 (all from Ciba).

In one embodiment phosphites for inclusion in the present stabilizer compositions may be any of the phosphites as described previously herein. In another embodiment, of particular note are hindered phosphites, such as Irgafos 168 (Tris-(di-tert-butylphenyl) phosphite), Irgafos OPH (Di-n-octyl phosphite), or Irgafos DDPP (Iso-decyl diphenyl phosphite) (all from Ciba), are useful in stabilizer compositions.

In one embodiment, amines for inclusion in the present stabilizer compositions may comprise any of the amines as described previously herein. In another embodiment, of particular note, are those hindered amine antioxidants derived from substituted piperidine compounds, in particular derivatives of an alkyl-substituted piperidyl, piperidinyl, piperazinone, or alkoxypiperidinyl compounds. Representative hindered amine antioxidants are 2,2,6,6-tetramethyl-4-piperidone; 2,2,6,6-tetramethyl-4-piperidinol; bis-(1,2,2,6,6-pentamethylpiperidyl) sebacate (CAS reg. no. [41556-26-7]); di-(2,2,6,6-tetramethyl-4-piperidyl)sebacate, such as Tinuvin® 770; poly-(N-hydroxyethyl-2,2,6,6-tetramethyl-4-hydroxy-piperidyl succinate (CAS reg. no. [65447-77-0]), such as Tinuvin® 622LD (Ciba). Some additional hindered amine antioxidants include Tinuvin® 765 (Ciba), BLS® 1944 (Mayzo, Inc.), and BLS® 1770 (Mayzo).

In another embodiment, stabilizer compositions may comprise hindered phenols, and any of the compounds selected from the group consisting of thiophosphates, dialkylthiophosphate esters, butylated triphenylphosphorothionates, epoxides, fluorinated epoxides, oxetanes, lactones, divinyl terephalic acid, and diphenyl terephalic acid (all having been described previously herein). In another embodiment, a stabilizer composition may comprise at least one hindered phenol and at least one phosphorous containing compound, such as an aryl phosphite, phosphorous acid, or bis(2,4-bis(1,1-dimethylethyl)-6-methylphenol)ethyl ether.

In one embodiment, the present stabilizer compositions comprise amines and phosphites. In another embodiment, the present stabilizer compositions comprise amines and ionic liquids.

In one embodiment, the present stabilizer compositions comprise ionic liquids and phosphites.

In one embodiment, the present stabilizer compositions comprise terpenes or terpenoids and phosphites. In another embodiment, the present stabilizer compositions comprise terpenes or terpenoids and hindered phenols. In another embodiment, the present stabilizer compositions comprise terpenes or terpenoids and amines. In another embodiment, the present stabilizer compositions comprise terpenes or terpenoids and ionic liquids. In another embodiment, the present stabilizer compositions comprise terpenes or terpenoids and epoxides.

In one embodiment, the present stabilizer compositions comprise epoxides or oxetanes and phosphites. In another embodiment, the present stabilizer compositions comprise epoxides or oxetanes and hindered phenols. In another embodiment, the present stabilizer compositions comprise epoxides or oxetanes and amines. In another embodiment, the present stabilizer compositions comprise epoxides or oxetanes and ionic liquids.

In another embodiment, any stabilizer composition as described above herein may further comprise at least one metal deactivator selected from the group consisting of areoxalyl bis(benzylidene)hydrazide (CAS reg. no. 6629-10-3); N,N'-bis(3,5-di-tert-butyl-4-hydroxyhydrocinnamoylhydrazine) (CAS reg. no. 32687-78-8); 2,2'-oxamidobis-ethyl-(3,5-d-tert-butyl-4-hydroxyhydorcinnamate) (CAS reg. no. 70331-94-1); N,N'-(disalicyclidene)-1,2-propanediamine (CAS reg. no. 94-91-1); ethylenediaminetetraacetic acid (CAS reg. no. 60-00-4) and salts thereof; triazoles; benzotriazole, 2-mercaptobenzothiazole, tolutriazole derivatives, and N,N-disalicylidene-1,2-diaminopropane.

In another embodiment, a stabilizer composition comprises at least one hindered phenol, at least one phosphite and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydrocinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, a stabilizer composition comprises at least one hindered phenol, at least one amine, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, a stabilizer composition comprises at least one hindered phenol, at least one ionic liquid, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, a stabilizer composition comprises at least one hindered phenol; at least one compound selected from the group consisting of thiophosphates, dialkylthiophosphate esters, butylated triphenylphosphorothionates, epoxides, oxetanes, lactones, divinyl terephalic acid, and diphenyl terephalic acid; and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, a stabilizer composition comprises at least one hindered phenol; at least one phosphorous containing compound selected from the group consisting of aryl phosphites, phosphorous acid, and bis(2,4-bis(1,1-dimethylethyl)-6-methylphenol)ethyl ether; and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, a stabilizer composition comprises at least one hindered phenol; at least one compound selected from the group consisting of diphenyl amine and phenol-alpha-naphthylamine; and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, a stabilizer composition comprises at least one amine, at least one phosphite and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, a stabilizer composition comprises at least one amine, at least one ionic liquid and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, a stabilizer composition comprises at least one ionic liquid, at least one phosphite, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, the present stabilizer compositions comprise at least one terpene or terpenoid, at least one phosphite, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, the present stabilizer compositions comprise at least one terpene or terpenoid, at least one hindered phenol, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, the present stabilizer compositions comprise at least one terpene or terpenoid, at least one amine, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, the present stabilizer compositions comprise at least one terpene or terpenoid, at least one ionic liquid, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, the present stabilizer compositions comprise at least one terpene or terpenoid, at least one epoxide, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, the present stabilizer compositions comprise at least one epoxide or oxetane, phosphite, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, the present stabilizer compositions comprise at least one epoxide or oxetane, at least one hindered phenol, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, the present stabilizer compositions comprise at least one epoxide or oxetane, at least one amine, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

In another embodiment, the present stabilizer compositions comprise at least one epoxide or oxetane, at least one ionic liquid, and at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, and N,N-disalicylidene-1,2-diaminopropane.

Further disclosed herein is a composition comprising iodotrifluoromethane and an effective amount of a stabilizer comprising any of the following, including mixtures of any of the following: fullerenes, graphite, a polycyclic aromatic selected from the group consisting of naphthalene and ferrocene, a functionalized perfluoropolyether, an alkylated aromatic, a metal salt, or a polyoxyalkylated aromatic as represented by the formula below:

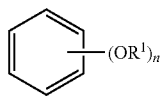

wherein the $R^1$ group is a polyoxyalkylated group comprising at least one —$CH_2CH_2O$— moiety.

The compositions of the present invention may further comprise at least one refrigerant selected from the group consisting of fluoroolefins, hydrofluorocarbons, hydrocarbons, dimethyl ether, ammonia, and carbon dioxide ($CO_2$).

In one embodiment, fluoroolefin refrigerants comprise compounds with 2 to 12 carbon atoms, in another embodiment the fluoroolefins comprise compounds 3 to 10 carbon atoms, and in yet another embodiment the fluoroolefins comprise compounds 3 to 7 carbon atoms. Representative fluoroolefins include but are not limited to all compounds as listed in Table 1, Table 2, and Table 3.

In one embodiment, fluoroolefin refrigerants have the formula E- or Z—$R^1CH$=$CHR^2$ (Formula 5), wherein $R^1$ and $R^2$ are, independently, $C_1$ to $C_6$ perfluoroalkyl groups. Examples of $R^1$ and $R^2$ groups include, but are not limited to, $CF_3$, $C_2F_5$, $CF_2CF_2CF_3$, $CF(CF_3)_2$, $CF_2CF_2CF_2CF_3$, $CF(CF_3)CF_2CF_3$, $CF_2CF(CF_3)_2$, $C(CF_3)_3$, $CF_2CF_2CF_2CF_2CF_3$, $CF_2CF_2CF(CF_3)_2$, $C(CF_3)_2C_2F_5$, $CF_2CF_2CF_2CF_2CF_2CF_3$, $CF(CF_3)$ $CF_2CF_2C_2F_5$, and $C(CF_3)_2$ $CF_2C_2F_5$. In one embodiment the fluoroolefins of Formula 5, have at least about 4 carbon atoms in the molecule. In another embodiment, the fluoroolefins of Formula I have at least about 5 carbon atoms in the molecule. Exemplary, non-limiting Formula I compounds are presented in Table 1.

TABLE 1

| Code | Structure | Chemical Name |
| --- | --- | --- |
| F11E | $CF_3CH$=$CHCF_3$ | 1,1,1,4,4,4-hexafluorobut-2-ene |
| F12E | $CF_3CH$=$CHC_2F_5$ | 1,1,1,4,4,5,5,5-octafluoropent-2-ene |
| F13E | $CF_3CH$=$CHCF_2C_2F_5$ | 1,1,1,4,4,5,5,6,6,6-decafluorohex-2-ene |
| F13iE | $CF_3CH$=$CHCF(CF_3)_2$ | 1,1,1,4,5,5,5-heptafluoro-4-(trifluoromethyl)pent-2-ene |
| F22E | $C_2F_5CH$=$CHC_2F_5$ | 1,1,1,2,2,5,5,6,6,6-decafluorohex-3-ene |
| F14E | $CF_3CH$=$CH(CF_2)_3CF_3$ | 1,1,1,4,4,5,5,6,6,7,7,7-dodecafluorohept-2-ene |
| F14iE | $CF_3CH$=$CHCF_2CF$—$(CF_3)_2$ | 1,1,1,4,4,5,6,6,6-nonafluoro-5-(trifluoromethyl)hex-2-ene |
| F14sE | $CF_3CH$=$CHCF(CF_3)$—$C_2F_5$ | 1,1,1,4,5,5,6,6,6-nonfluoro-4-(trifluoromethyl)hex-2-ene |
| F14tE | $CF_3CH$=$CHC(CF_3)_3$ | 1,1,1,5,5,5-hexafluoro-4,4-bis(trifluoromethyl)pent-2-ene |
| F23E | $C_2F_5CH$=$CHCF_2C_2F_5$ | 1,1,1,2,2,5,5,6,6,7,7,7-dodecafluorohept-3-ene |
| F23iE | $C_2F_5CH$=$CHCF(CF_3)_2$ | 1,1,1,2,2,5,6,6,6-nonafluoro-5-(trifluoromethyl)hex-3-ene |
| F15E | $CF_3CH$=$CH(CF_2)_4CF_3$ | 1,1,1,4,4,5,5,6,6,7,7,8,8,8-tetradecafluorooct-2-ene |
| F15iE | $CF_3CH$=$CH$—$CF_2CF_2CF(CF_3)_2$ | 1,1,1,4,4,5,5,6,7,7,7-undecafluoro-6-(trifluoromethyl)hept-2-ene |
| F15tE | $CF_3CH$=$CH$—$C(CF_3)_2C_2F_5$ | 1,1,1,5,5,6,6,6-octafluoro-4,4-bis(trifluoromethyl)hex-2-ene |
| F24E | $C_2F_5CH$=$CH(CF_2)_3CF_3$ | 1,1,1,2,2,5,5,6,6,7,7,8,8,8-tetradecafluorooct-3-ene |
| F24iE | $C_2F_5CH$=$CHCF_2CF$—$(CF_3)_2$ | 1,1,1,2,2,5,5,6,7,7,7-undecafluoro-6-(trifluoromethyl)hept-3-ene |
| F24sE | $C_2F_5CH$=$CHCF(CF_3)$—$C_2F_5$ | 1,1,1,2,2,5,6,6,7,7,7-undecafluoro-5-(trifluoromethyl)hept-3-ene |
| F24tE | $C_2F_5CH$=$CHC(CF_3)_3$ | 1,1,1,2,2,6,6,6-octafluoro-5,5-bis(trifluoromethyl)hex-3-ene |
| F33E | $C_2F_5CF_2CH$=$CH$—$CF_2C_2F_5$ | 1,1,1,2,2,3,3,6,6,7,7,8,8-tetradecafluorooct-4-ene |
| F3i3iE | $(CF_3)_2CFCH$=$CH$—$CF(CF_3)_2$ | 1,1,1,2,5,6,6,6-octafluoro-2,5-bis(trifluoromethyl)hex-3-ene |
| F33iE | $C_2F_5CF_2CH$=$CH$—$CF(CF_3)_2$ | 1,1,1,2,5,5,6,6,7,7,7-undecafluoro-2-(trifluoromethyl)hept-3-ene |
| F16E | $CF_3CH$=$CH(CF_2)_5CF_3$ | 1,1,1,4,4,5,5,6,6,7,7,8,8,,9,9,9-hexadecafluoronon-2-ene |
| F16sE | $CF_3CH$=$CHCF(CF_3)(CF_2)_2C_2F_5$ | 1,1,1,4,5,5,6,6,7,7,8,8,8-tridecafluoro-4-(trifluoromethyl)hept-2-ene |
| F16tE | $CF_3CH$=$CHC(CF_3)_2CF_2C_2F_5$ | 1,1,1,6,6,6-octafluoro-4,4-bis(trifluoromethyl)hept-2-ene |
| F25E | $C_2F_5CH$=$CH(CF_2)_4CF_3$ | 1,1,1,2,2,5,5,6,6,7,7,8,8,9,9,9-hexadecafluoronon-3-ene |
| F25iE | $C_2F_5CH$=$CH$—$CF_2CF_2CF(CF_3)_2$ | 1,1,1,2,2,5,5,6,6,7,8,8,8-tridecafluoro-7-(trifluoromethyl)oct-3-ene |
| F25tE | $C_2F_5CH$=$CH$—$C(CF_3)_2C_2F_5$ | 1,1,1,2,2,6,6,7,7,7-decafluoro-5,5-bis(trifluoromethyl)hept-3-ene |
| F34E | $C_2F_5CF_2CH$=$CH$—$(CF_2)_3CF_3$ | 1,1,1,2,2,3,3,6,6,7,7,8,8,9,9,9-hexadecafluoronon-4-ene |
| F34iE | $C_2F_5CF_2CH$=$CH$—$CF_2CF(CF_3)_2$ | 1,1,1,2,2,3,3,6,6,7,8,8,8-tridecafluoro-7-(trifluoromethyl)oct-4-ene |
| F34sE | $C_2F_5CF_2CH$=$CH$—$CF(CF_3)C_2F_5$ | 1,1,1,2,2,3,3,6,7,7,8,8,8-tridecafluoro-6-(trifluoromethyl)oct-4-ene |
| F34tE | $C_2F_5CF_2CH$=$CH$—$C(CF_3)_3$ | 1,1,1,5,5,6,6,7,7,7-decafluoro-2,2-bis(trifluoromethyl)hept-3-ene |
| F3i4E | $(CF_3)_2CFCH$=$CH$—$(CF_2)_3CF_3$ | 1,1,1,2,5,5,6,6,7,7,8,8,8-tridecafluoro-2(trifluoromethyl)oct-3-ene |
| F3i4iE | $(CF_3)_2CFCH$=$CH$—$CF_2CF(CF_3)_2$ | 1,1,1,2,5,5,6,7,7,7-decafluoro-2,6-bis(trifluoromethyl)hept-3-ene |
| F3i4sE | $(CF_3)_2CFCH$=$CH$—$CF(CF_3)C_2F_5$ | 1,1,1,2,5,6,6,7,7,7-decafluoro-2,5-bis(trifluoromethyl)hept-3-ene |
| F3i4tE | $(CF_3)_2CFCH$=$CH$—$C(CF_3)_3$ | 1,1,1,2,6,6,6-heptafluoro-2,5,5-tris(trifluoromethyl)hex-3-ene |
| F26E | $C_2F_5CH$=$CH(CF_2)_5CF_3$ | 1,1,1,2,2,5,5,6,6,7,7,8,8,9,9,10,10,10-octadecafluorodec-3-ene |
| F26sE | $C_2F_5CH$=$CHCF(CF_3)(CF_2)_2C_2F_5$ | 1,1,1,2,2,5,6,6,7,7,8,8,9,9,9-pentadecafluoro-5-(trifluoromethyl)non-3-ene |

TABLE 1-continued

| Code | Structure | Chemical Name |
|---|---|---|
| F26tE | $C_2F_5CH=CHC(CF_3)_2CF_2C_2F_5$ | 1,1,1,2,2,6,6,7,7,8,8,8-dodecafluoro-5,5-bis(trifluoromethyl)oct-3-ene |
| F35E | $C_2F_5CF_2CH=CH-(CF_2)_4CF_3$ | 1,1,1,2,2,3,3,6,6,7,7,8,8,9,9,10,10,10-octadecafluorodec-4-ene |
| F35iE | $C_2F_5CF_2CH=CH-CF_2CF_2CF(CF_3)_2$ | 1,1,1,2,2,3,3,6,6,7,7,8,9,9,9-pentadecafluoro-8-(trifluoromethyl)non-4-ene |
| F35tE | $C_2F_5CF_2CH=CH-C(CF_3)_2C_2F_5$ | 1,1,1,2,2,3,3,7,7,8,8,8-dodecafluoro-6,6-bis(trifluoromethyl)oct-4-ene |
| F3i5E | $(CF_3)_2CFCH=CH-(CF_2)_4CF_3$ | 1,1,1,2,5,5,6,6,7,7,8,8,9,9,9-pentadecafluoro-2-(trifluoromethyl)non-3-ene |
| F3i5iE | $(CF_3)_2CFCH=CH-CF_2CF_2CF(CF_3)_2$ | 1,1,1,2,5,5,6,6,7,8,8,8-dodecafluoro-2,7-bis(trifluoromethyl)oct-3-ene |
| F3i5tE | $(CF_3)_2CFCH=CH-C(CF_3)_2C_2F_5$ | 1,1,1,2,6,6,7,7,7-nonafluoro-2,5,5-tris(trifluoromethyl)hept-3-ene |
| F44E | $CF_3(CF_2)_3CH=CH-(CF_2)_3CF_3$ | 1,1,1,2,2,3,3,4,4,7,7,8,8,9,9,10,10,10-octadecafluorodec-5-ene |
| F44iE | $CF_3(CF_2)_3CH=CH-CF_2CF(CF_3)_2$ | 1,1,1,2,3,3,6,6,7,7,8,9,9,9-pentadecafluoro-2-(trifluoromethyl)non-4-ene |
| F44sE | $CF_3(CF_2)_3CH=CH-CF(CF_3)C_2F_5$ | 1,1,1,2,2,3,6,6,7,7,8,8,9,9,9-pentadecafluoro-3-(trifluoromethyl)non-4-ene |
| F44tE | $CF_3(CF_2)_3CH=CH-C(CF_3)_3$ | 1,1,1,5,5,6,6,7,7,8,8,8-dodecafluoro-2,2,-bis(trifluoromethyl)oct-3-ene |
| F4i4iE | $(CF_3)_2CFCF_2CH=CH-CF_2CF(CF_3)_2$ | 1,1,1,2,3,3,6,6,7,8,8,8-dodecafluoro-2,7-bis(trifluoromethyl)oct-4-ene |
| F4i4sE | $(CF_3)_2CFCF_2CH=CH-CF(CF_3)C_2F_5$ | 1,1,1,2,3,3,6,7,7,8,8,8-dodecafluoro-2,6-bis(trifluoromethyl)oct-4-ene |
| F4i4tE | $(CF_3)_2CFCF_2CH=CH-C(CF_3)_3$ | 1,1,1,5,5,6,7,7,7-nonafluoro-2,2,6-tris(trifluoromethyl)hept-3-ene |
| F4s4sE | $C_2F_5CF(CF_3)CH=CH-CF(CF_3)C_2F_5$ | 1,1,1,2,2,3,6,7,7,8,8,8-dodecafluoro-3,6-bis(trifluoromethyl)oct-4-ene |
| F4s4tE | $C_2F_5CF(CF_3)CH=CH-C(CF_3)_3$ | 1,1,1,5,6,6,7,7,7-nonafluoro-2,2,5-tris(trifluoromethyl)hept-3-ene |
| F4t4tE | $(CF_3)_3CCH=CH-C(CF_3)_3$ | 1,1,1,6,6,6-hexafluoro-2,2,5,5-tetrakis(trifluoromethyl)hex-3-ene |

Compounds of Formula 5 may be prepared by contacting a perfluoroalkyl iodide of the formula $R^1I$ with a perfluoroalkyltrihydroolefin of the formula $R^2CH=CH_2$ to form a trihydroiodoperfluoroalkane of the formula $R^1CH_2CHIR^2$. This trihydroiodoperfluoroalkane can then be dehydroiodinated to form $R^1CH=CHR^2$. Alternatively, the olefin $R^1CH=CHR^2$ may be prepared by dehydroiodination of a trihydroiodoperfluoroalkane of the formula $R^1CHICH_2R^2$ formed in turn by reacting a perfluoroalkyl iodide of the formula $R^2I$ with a perfluoroalkyltrihydroolefin of the formula $R^1CH=CH_2$.

Said contacting of a perfluoroalkyl iodide with a perfluoroalkyltrihydroolefin may take place in batch mode by combining the reactants in a suitable reaction vessel capable of operating under the autogenous pressure of the reactants and products at reaction temperature. Suitable reaction vessels include fabricated from stainless steels, in particular of the austenitic type, and the well-known high nickel alloys such as Monel® nickel-copper alloys, Hastelloy® nickel based alloys and Inconel® nickel-chromium alloys.

Alternatively, the reaction may take be conducted in semi-batch mode in which the perfluoroalkyltrihydroolefin reactant is added to the perfluoroalkyl iodide reactant by means of a suitable addition apparatus such as a pump at the reaction temperature.

The ratio of perfluoroalkyl iodide to perfluoroalkyltrihydroolefin should be between about 1:1 to about 4:1, preferably from about 1.5:1 to 2.5:1. Ratios less than 1.5:1 tend to result in large amounts of the 2:1 adduct as reported by Jeanneaux, et. al. in *Journal of Fluorine Chemistry*, Vol. 4, pages 261-270 (1974).

Preferred temperatures for contacting of said perfluoroalkyl iodide with said perfluoroalkyltrihydroolefin are preferably within the range of about 150° C. to 300° C., preferably from about 170° C. to about 250° C., and most preferably from about 180° C. to about 230° C.

Suitable contact times for the reaction of the perfluoroalkyl iodide with the perfluoroalkyltrihydroolefin are from about 0.5 hour to 18 hours, preferably from about 4 to about 12 hours.

The trihydroiodoperfluoroalkane prepared by reaction of the perfluoroalkyl iodide with the perfluoroalkyltrihydroolefin may be used directly in the dehydroiodination step or may preferably be recovered and purified by distillation prior to the dehydroiodination step.

The dehydroiodination step is carried out by contacting the trihydroiodoperfluoroalkane with a basic substance. Suitable basic substances include alkali metal hydroxides (e.g., sodium hydroxide or potassium hydroxide), alkali metal oxide (for example, sodium oxide), alkaline earth metal hydroxides (e.g., calcium hydroxide), alkaline earth metal oxides (e.g., calcium oxide), alkali metal alkoxides (e.g., sodium methoxide or sodium ethoxide), aqueous ammonia, sodium amide, or mixtures of basic substances such as soda lime. Preferred basic substances are sodium hydroxide and potassium hydroxide.

Said contacting of the trihydroiodoperfluoroalkane with a basic substance may take place in the liquid phase preferably in the presence of a solvent capable of dissolving at least a portion of both reactants. Solvents suitable for the dehydroiodination step include one or more polar organic solvents such as alcohols (e.g., methanol, ethanol, n-propanol, isopropanol, n-butanol, isobutanol, and tertiary butanol), nitriles (e.g., acetonitrile, propionitrile, butyronitrile, benzonitrile, or adiponitrile), dimethyl sulfoxide, N,N-dimethylformamide, N,N-dimethylacetamide, or sulfolane. The choice of solvent may depend on the boiling point product and the ease of separation of traces of the solvent from the product during purification. Typically, ethanol or isopropanol are good solvents for the reaction.

Typically, the dehydroiodination reaction may be carried out by addition of one of the reactants (either the basic substance or the trihydroiodoperfluoroalkane) to the other reactant in a suitable reaction vessel. Said reaction may be fabricated from glass, ceramic, or metal and is preferably agitated with an impeller or stirring mechanism.

Temperatures suitable for the dehydroiodination reaction are from about 10° C. to about 100° C., preferably from about 20° C. to about 70° C. The dehydroiodination reaction may be carried out at ambient pressure or at reduced or elevated pressure. Of note are dehydroiodination reactions in which the compound of Formula I is distilled out of the reaction vessel as it is formed.

Alternatively, the dehydroiodination reaction may be conducted by contacting an aqueous solution of said basic substance with a solution of the trihydroiodoperfluoroalkane in one or more organic solvents of lower polarity such as an alkane (e.g., hexane, heptane, or octane), aromatic hydrocarbon (e.g., toluene), halogenated hydrocarbon (e.g., methylene chloride, chloroform, carbon tetrachloride, or perchloroethylene), or ether (e.g., diethyl ether, methyl tert-butyl ether, tetrahydrofuran, 2-methyl tetrahydrofuran, dioxane, dimethoxyethane, diglyme, or tetraglyme) in the presence of a phase transfer catalyst. Suitable phase transfer catalysts include quaternary ammonium halides (e.g., tetrabutylammonium bromide, tetrabutylammonium hydrosulfate, triethylbenzylammonium chloride, dodecyltrimethylammonium chloride, and tricaprylylmethylammonium chloride), quaternary phosphonium halides (e.g., triphenylmethylphosphonium bromide and tetraphenylphosphonium chloride), or cyclic polyether compounds known in the art as crown ethers (e.g., 18-crown-6 and 15-crown-5).

Alternatively, the dehydroiodination reaction may be conducted in the absence of solvent by adding the trihydroiodoperfluoroalkane to a solid or liquid basic substance.

Suitable reaction times for the dehydroiodination reactions are from about 15 minutes to about six hours or more depending on the solubility of the reactants. Typically the dehydroiodination reaction is rapid and requires about 30 minutes to about three hours for completion.

The compound of formula I may be recovered from the dehydroiodination reaction mixture by phase separation after addition of water, by distillation, or by a combination thereof.

In another embodiment of the present invention, fluoroolefins comprise cyclic fluoroolefins (cyclo-[CX=CY(CZW)$_n$—] (Formula 6), wherein X, Y, Z, and W are independently selected from H and F, and n is an integer from 2 to 5). In one embodiment the fluoroolefins of Formula 6, have at least about 3 carbon atoms in the molecule. In another embodiment, the fluoroolefins of Formula 6 have at least about 4 carbon atoms in the molecule. In yet another embodiment, the fluoroolefins of Formula 6 have at least about 5 carbon atoms in the molecule. Representative cyclic fluoroolefins of Formula 6 are listed in Table 2.

TABLE 2

| Cyclic fluoroolefins | Structure | Chemical name |
|---|---|---|
| FC-C1316cc | cyclo-$CF_2CF_2CF=CF$— | 1,2,3,3,4,4-hexafluorocyclobutene |
| HFC-C1334cc | cyclo-$CF_2CF_2CH=CH$— | 3,3,4,4-tetrafluorocyclobutene |
| HFC-C1436 | cyclo-$CF_2CF_2CF_2CH=CH$— | 3,3,4,4,5,5,-hexafluorocyclopentene |
| FC-C1418y | cyclo-$CF_2CF=CFCF_2CF_2$— | 1,2,3,3,4,4,5,5-octafluorocyclopentene |
| FC-C151-10y | cyclo-$CF_2CF=CFCF_2CF_2CF_2$— | 1,2,3,3,4,4,5,5,6,6-decafluorocyclohexene |

The compositions of the present invention may comprise a single compound of Formula 5 or formula 6, for example, one of the compounds in Table 1 or Table 2, or may comprise a combination of compounds of Formula 5 or formula 6.

In another embodiment, fluoroolefins may comprise those compounds listed in Table 3.

TABLE 3

| Name | Structure | Chemical name |
|---|---|---|
| HFC-1225ye | $CF_3CF=CHF$ | 1,2,3,3,3-pentafluoro-1-propene |
| HFC-1225zc | $CF_3CH=CF_2$ | 1,1,3,3,3-pentafluoro-1-propene |
| HFC-1225yc | $CHF_2CF=CF_2$ | 1,1,2,3,3-pentafluoro-1-propene |
| HFC-1234ye | $CHF_2CF=CHF$ | 1,2,3,3-tetrafluoro-1-propene |
| HFC-1234yf | $CF_3CF=CH_2$ | 2,3,3,3-tetrafluoro-1-propene |
| HFC-1234ze | $CF_3CH=CHF$ | 1,3,3,3-tetrafluoro-1-propene |
| HFC-1234yc | $CH_2FCF=CF_2$ | 1,1,2,3-tetrafluoro-1-propene |
| HFC-1234zc | $CHF_2CH=CF_2$ | 1,1,3,3-tetrafluoro-1-propene |
| HFC-1243yf | $CHF_2CF=CH_2$ | 2,3,3-trifluoro-1-propene |
| HFC-1243zf | $CF_3CH=CH_2$ | 3,3,3-trifluoro-1-propene |
| HFC-1243yc | $CH_3CF=CF_2$ | 1,1,2-trifluoro-1-propene |
| HFC-1243zc | $CH_2FCH=CF_2$ | 1,1,3-trifluoro-1-propene |
| HFC-1243ye | $CH_2FCF=CHF$ | 1,2,3-trifluoro-1-propene |
| HFC-1243ze | $CHF_2CH=CHF$ | 1,3,3-trifluoro-1-propene |
| FC-1318my | $CF_3CF=CFCF_3$ | 1,1,1,2,3,4,4,4-octafluoro-2-butene |
| FC-1318cy | $CF_3CF_2CF=CF_2$ | 1,1,2,3,3,4,4,4-octafluoro-1-butene |
| HFC-1327my | $CF_3CF=CHCF_3$ | 1,1,1,2,4,4,4-heptafluoro-2-butene |
| HFC-1327ye | $CHF=CFCF_2CF_3$ | 1,2,3,3,4,4,4-heptafluoro-1-butene |
| HFC-1327py | $CHF_2CF=CFCF_3$ | 1,1,1,2,3,4,4-heptafluoro-2-butene |
| HFC-1327et | $(CF_3)_2C=CHF$ | 1,3,3,3-tetrafluoro-2-(trifluoromethyl)-1-propene |
| HFC-1327cz | $CF_2=CHCF_2CF_3$ | 1,1,3,3,4,4,4-heptafluoro-1-butene |
| HFC-1327cye | $CF_2=CFCHFCF_3$ | 1,1,2,3,4,4,4-heptafluoro-1-butene |
| HFC-1327cyc | $CF_2=CFCF_2CHF_2$ | 1,1,2,3,3,4,4-heptafluoro-1-butene |
| HFC-1336yf | $CF_3CF_2CF=CH_2$ | 2,3,3,4,4,4-hexafluoro-1-butene |
| HFC-1336ze | $CHF=CHCF_2CF_3$ | 1,3,3,4,4,4-hexafluoro-1-butene |

TABLE 3-continued

| Name | Structure | Chemical name |
|---|---|---|
| HFC-1336eye | CHF=CFCHFCF$_3$ | 1,2,3,4,4,4-hexafluoro-1-butene |
| HFC-1336eyc | CHF=CFCF$_2$CHF$_2$ | 1,2,3,4,4,4-hexafluoro-1-butene |
| HFC-1336pyy | CHF$_2$CF=CFCHF$_2$ | 1,1,2,3,4,4-hexafluoro-2-butene |
| HFC-1336qy | CH$_2$FCF=CFCF$_3$ | 1,1,1,2,3,4-hexafluoro-2-butene |
| HFC-1336pz | CHF$_2$CH=CFCF$_3$ | 1,1,1,2,4,4-hexafluoro-2-butene |
| HFC-1336mzy | CF$_3$CH=CFCHF$_2$ | 1,1,1,3,4,4-hexafluoro-2-butene |
| HFC-1336qc | CF$_2$=CFCF$_2$CH$_2$F | 1,1,2,3,3,4-hexafluoro-1-butene |
| HFC-1336pe | CF$_2$=CFCHFCHF$_2$ | 1,1,2,3,4,4-hexafluoro-1-butene |
| HFC-1336ft | CH$_2$=C(CF$_3$)$_2$ | 3,3,3-trifluoro-2-(trifluoromethyl)-1-propene |
| HFC-1345qz | CH$_2$FCH=CFCF$_3$ | 1,1,1,2,4-pentafluoro-2-butene |
| HFC-1345mzy | CF$_3$CH=CFCH$_2$F | 1,1,1,3,4-pentafluoro-2-butene |
| HFC-1345fz | CF$_3$CF$_2$CH=CH$_2$ | 3,3,4,4,4-pentafluoro-1-butene |
| HFC-1345mzz | CHF$_2$CH=CHCF$_3$ | 1,1,1,4,4-pentafluoro-2-butene |
| HFC-1345sy | CH$_3$CF=CFCF$_3$ | 1,1,1,2,3-pentafluoro-2-butene |
| HFC-1345fyc | CH$_2$=CFCF$_2$CHF$_2$ | 2,3,3,4,4-pentafluoro-1-butene |
| HFC-1345pyz | CHF$_2$CF=CHCHF$_2$ | 1,1,2,4,4-pentafluoro-2-butene |
| HFC-1345cyc | CH$_3$CF$_2$CF=CF$_2$ | 1,1,2,3,3-pentafluoro-1-butene |
| HFC-1345pyy | CH$_2$FCF=CFCHF$_2$ | 1,1,2,3,4-pentafluoro-2-butene |
| HFC-1345eyc | CH$_2$FCF$_2$CF=CF$_2$ | 1,2,3,3,4-pentafluoro-1-butene |
| HFC-1345ctm | CF$_2$=C(CF$_3$)(CH$_3$) | 1,1,3,3,3-pentafluoro-2-methyl-1-propene |
| HFC-1345ftp | CH$_2$=C(CHF$_2$)(CF$_3$) | 2-(difluoromethyl)-3,3,3-trifluoro-1-propene |
| HFC1345fye | CH$_2$=CFCHFCF$_3$ | 2,3,4,4,4-pentafluoro-1-butene |
| HFC-1345eyf | CHF=CFCH$_2$CF$_3$ | 1,2,4,4,4-pentafluoro-1-butene |
| HFC-1345eze | CHF=CHCHFCF$_3$ | 1,3,4,4,4-pentafluoro-1-butene |
| HFC-1345ezc | CHF=CHCF$_2$CHF$_2$ | 1,3,3,4,4-pentafluoro-1-butene |
| HFC-1345eye | CHF=CFCHFCHF$_2$ | 1,2,3,4,4-pentafluoro-1-butene |
| HFC-1354fzc | CH$_2$=CHCF$_2$CHF$_2$ | 3,3,4,4-tetrafluoro-1-butene |
| HFC-1354ctp | CF$_2$=C(CHF$_2$)(CH$_3$) | 1,1,3,3-tetrafluoro-2-methyl-1-propene |
| HFC-1354etm | CHF=C(CF$_3$)(CH$_3$) | 1,3,3,3-tetrafluoro-2-methyl-1-propene |
| HFC-1354tfp | CH$_2$=C(CHF$_2$)$_2$ | 2-(difluoromethyl)-3,3-difluoro-1-propene |
| HFC-1354my | CF$_3$CF=CHCH$_3$ | 1,1,1,2-tetrafluoro-2-butene |
| HFC-1354mzy | CH$_3$CF=CHCF$_3$ | 1,1,1,3-tetrafluoro-2-butene |
| FC-141-10myy | CF$_3$CF=CFCF$_2$CF$_3$ | 1,1,1,2,3,4,4,5,5-decafluoro-2-pentene |
| FC-141-10cy | CF$_2$=CFCF$_2$CF$_2$CF$_3$ | 1,1,2,3,3,4,4,5,5-decafluoro-1-pentene |
| HFC-1429mzt | (CF$_3$)$_2$C=CHCF$_3$ | 1,1,1,4,4,4-hexafluoro-2-(trifluoromethyl)-2-butene |
| HFC-1429myz | CF$_3$CF=CHCF$_2$CF$_3$ | 1,1,1,2,4,4,5,5,5-nonafluoro-2-pentene |
| HFC-1429mzy | CF$_3$CH=CFCF$_2$CF$_3$ | 1,1,1,3,4,4,5,5,5-nonafluoro-2-pentene |
| HFC-1429eyc | CHF=CFCF$_2$CF$_2$CF$_3$ | 1,2,3,3,4,4,5,5,5-nonafluoro-1-pentene |
| HFC-1429czc | CF$_2$=CHCF$_2$CF$_2$CF$_3$ | 1,1,3,3,4,4,5,5,5-nonafluoro-1-pentene |
| HFC-1429cycc | CF$_2$=CFCF$_2$CF$_2$CHF$_2$ | 1,1,2,3,3,4,4,5,5-nonafluoro-1-pentene |
| HFC-1429pyy | CHF$_2$CF=CFCF$_2$CF$_3$ | 1,1,2,3,4,4,5,5,5-nonafluoro-2-pentene |
| HFC-1429myyc | CF$_3$CF=CFCF$_2$CHF$_2$ | 1,1,1,2,3,4,4,5,5-nonafluoro-2-pentene |
| HFC-1429myye | CF$_3$CF=CFCHFCF$_3$ | 1,1,1,2,3,4,5,5,5-nonafluoro-2-pentene |
| HFC-1429eyym | CHF=CFCF(CF$_3$)$_2$ | 1,2,3,4,4,4-hexafluoro-3-(trifluoromethyl)-1-butene |
| HFC-1429cyzm | CF$_2$=CFCH(CF$_3$)$_2$ | 1,1,2,4,4,4-hexafluoro-3-(trifluoromethyl)-1-butene |
| HFC-1429mzt | CF$_3$CH=C(CF$_3$)$_2$ | 1,1,1,4,4,4-hexafluoro-2-(trifluoromethyl)-2-butene |
| HFC-1429czym | CF$_2$=CHCF(CF$_3$)$_2$ | 1,1,3,4,4,4-hexafluoro-3-(trifluoromethyl)-1-butene |
| HFC-1438fy | CH$_2$=CFCF$_2$CF$_2$CF$_3$ | 2,3,3,4,4,5,5,5-octafluoro-1-pentene |
| HFC-1438eycc | CHF=CFCF$_2$CF$_2$CHF$_2$ | 1,2,3,3,4,4,5,5-octafluoro-1-pentene |
| HFC-1438ftmc | CH$_2$=C(CF$_3$)CF$_2$CF$_3$ | 3,3,4,4,4-pentafluoro-2-(trifluoromethyl)-1-butene |
| HFC-1438czzm | CF$_2$=CHCH(CF$_3$)$_2$ | 1,1,4,4,4-pentafluoro-3-(trifluoromethyl)-1-butene |
| HFC-1438ezym | CHF=CHCF(CF$_3$)$_2$ | 1,3,4,4,4-pentafluoro-3-(trifluoromethyl)-1-butene |

TABLE 3-continued

| Name | Structure | Chemical name |
| --- | --- | --- |
| HFC-1438ctmf | $CF_2=C(CF_3)CH_2CF_3$ | 1,1,4,4,4-pentafluoro-2-(trifluoromethyl)-1-butene |
| HFC-1447fzy | $(CF_3)_2CFCH=CH_2$ | 3,4,4,4-tetrafluoro-3-(trifluoromethyl)-1-butene |
| HFC-1447fz | $CF_3CF_2CF_2CH=CH_2$ | 3,3,4,4,5,5,5-heptafluoro-1-pentene |
| HFC-1447fycc | $CH_2=CFCF_2CF_2CHF_2$ | 2,3,3,4,4,5,5-heptafluoro-1-pentene |
| HFC-1447czcf | $CF_2=CHCF_2CH_2CF_3$ | 1,1,3,3,5,5,5-heptafluoro-1-pentene |
| HFC-1447mytm | $CF_3CF=C(CF_3)(CH_3)$ | 1,1,1,2,4,4,4-heptafluoro-3-methyl-2-butene |
| HFC-1447fyz | $CH_2=CFCH(CF_3)_2$ | 2,4,4,4-tetrafluoro-3-(trifluoromethyl)-1-butene |
| HFC-1447ezz | $CHF=CHCH(CF_3)_2$ | 1,4,4,4-tetrafluoro-3-(trifluoromethyl)-1-butene |
| HFC-1447qzt | $CH_2FCH=C(CF_3)_2$ | 1,4,4,4-tetrafluoro-2-(trifluoromethyl)-2-butene |
| HFC-1447syt | $CH_3CF=C(CF_3)_2$ | 2,4,4,4-tetrafluoro-2-(trifluoromethyl)-2-butene |
| HFC-1456szt | $(CF_3)_2C=CHCH_3$ | 3-(trifluoromethyl)-4,4,4-trifluoro-2-butene |
| HFC-1456szy | $CF_3CF_2CF=CHCH_3$ | 3,4,4,5,5,5-hexafluoro-2-pentene |
| HFC-1456mstz | $CF_3C(CH_3)=CHCF_3$ | 1,1,1,4,4,4-hexafluoro-2-methyl-2-butene |
| HFC-1456fzce | $CH_2=CHCF_2CHFCF_3$ | 3,3,4,5,5,5-hexafluoro-1-pentene |
| HFC-1456ftmf | $CH_2=C(CF_3)CH_2CF_3$ | 4,4,4-trifluoro-2-(trifluoromethyl)-1-butene |
| FC-151-12c | $CF_3(CF_2)_3CF=CF_2$ | 1,1,2,3,3,4,4,5,5,6,6,6-dodecafluoro-1-hexene (or perfluoro-1-hexene) |
| FC-151-12mcy | $CF_3CF_2CF=CFCF_2CF_3$ | 1,1,1,2,2,3,4,5,5,6,6,6-dodecafluoro-3-hexene (or perfluoro-3-hexene) |
| FC-151-12mmtt | $(CF_3)_2C=C(CF_3)_2$ | 1,1,1,4,4,4-hexafluoro-2,3-bis(trifluoromethyl)-2-butene |
| FC-151-12mmzz | $(CF_3)_2CFCF=CFCF_3$ | 1,1,1,2,3,4,5,5,5-nonafluoro-4-(trifluoromethyl)-2-pentene |
| HFC-152-11mmtz | $(CF_3)_2C=CHC_2F_5$ | 1,1,1,4,4,5,5,5-octafluoro-2-(trifluoromethyl)-2-pentene |
| HFC-152-11mmyyz | $(CF_3)_2CFCF=CHCF_3$ | 1,1,1,3,4,5,5,5-octafluoro-4-(trifluoromethyl)-2-pentene |
| PFBE (or HFC-1549fz) | $CF_3CF_2CF_2CF_2CH=CH_2$ | 3,3,4,4,5,5,6,6,6-nonafluoro-1-hexene (or perfluorobutylethylene) |
| HFC-1549fztmm | $CH_2=CHC(CF_3)_3$ | 4,4,4-trifluoro-3,3-bis(trifluoromethyl)-1-butene |
| HFC-1549mmtts | $(CF_3)_2C=C(CH_3)(CF_3)$ | 1,1,1,4,4,4-hexafluoro-3-methyl-2-(trifluoromethyl)-2-butene |
| HFC-1549fycz | $CH_2=CFCF_2CH(CF_3)_2$ | 2,3,3,5,5,5-hexafluoro-4-(trifluoromethyl)-1-pentene |
| HFC-1549myts | $CF_3CF=C(CH_3)CF_2CF_3$ | 1,1,1,2,4,4,5,5,5-nonafluoro-3-methyl-2-pentene |
| HFC-1549mzzz | $CF_3CH=CHCH(CF_3)_2$ | 1,1,1,5,5,5-hexafluoro-4-(trifluoromethyl)-2-pentene |
| HFC-1558szy | $CF_3CF_2CF_2CF=CHCH_3$ | 3,4,4,5,5,6,6,6-octafluoro-2-hexene |
| HFC-1558fzccc | $CH_2=CHCF_2CF_2CF_2CHF_2$ | 3,3,4,4,5,5,6,6-octafluoro-2-hexene |
| HFC-1558mmtzc | $(CF_3)_2C=CHCF_2CH_3$ | 1,1,1,4,4-pentafluoro-2-(trifluoromethyl)-2-pentene |
| HFC-1558ftmf | $CH_2=C(CF_3)CH_2C_2F_5$ | 4,4,5,5,5-pentafluoro-2-(trifluoromethyl)-1-pentene |
| HFC-1567fts | $CF_3CF_2CF_2C(CH_3)=CH_2$ | 3,3,4,4,5,5,5-heptafluoro-2-methyl-1-pentene |
| HFC-1567szz | $CF_3CF_2CF_2CH=CHCH_3$ | 4,4,5,5,6,6,6-heptafluoro-2-hexene |
| HFC-1567fzfc | $CH_2=CHCH_2CF_2C_2F_5$ | 4,4,5,5,6,6,6-heptafluoro-1-hexene |
| HFC-1567sfyy | $CF_3CF_2CF=CFC_2H_5$ | 1,1,1,2,2,3,4-heptafluoro-3-hexene |
| HFC-1567fzfy | $CH_2=CHCH_2CF(CF_3)_2$ | 4,5,5,5-tetrafluoro-4-(trifluoromethyl)-1-pentene |
| HFC-1567myzzm | $CF_3CF=CHCH(CF_3)(CH_3)$ | 1,1,1,2,5,5,5-heptafluoro-4-methyl-2-pentene |
| HFC-1567mmtyf | $(CF_3)_2C=CFC_2H_5$ | 1,1,1,3-tetrafluoro-2-(trifluoromethyl)-2-pentene |
| FC-161-14myy | $CF_3CF=CFCF_2CF_2C_2F_5$ | 1,1,1,2,3,4,4,5,5,6,6,7,7,7-tetradecafluoro-2-heptene |
| FC-161-14mcyy | $CF_3CF_2CF=CFCF_2C_2F_5$ | 1,1,1,2,2,3,4,5,5,6,6,7,7,7-tetradecafluoro-2-heptene |
| HFC-162-13mzy | $CF_3CH=CFCF_2CF_2C_2F_5$ | 1,1,1,3,4,4,5,5,6,6,7,7,7-tridecafluoro-2-heptene |
| HFC162-13myz | $CF_3CF=CHCF_2CF_2C_2F_5$ | 1,1,1,2,4,4,5,5,6,6,7,7,7-tridecafluoro-2-heptene |
| HFC-162-13mczy | $CF_3CF_2CH=CFCF_2C_2F_5$ | 1,1,1,2,2,4,5,5,6,6,7,7,7-tridecafluoro-3-heptene |

TABLE 3-continued

| Name | Structure | Chemical name |
| --- | --- | --- |
| HFC-162-13mcyz | $CF_3CF_2CF=CHCF_2C_2F_5$ | 1,1,1,2,2,3,5,5,6,6,7,7,7-tridecafluoro-3-heptene |
| PEVE | $CF_2=CFOCF_2CF_3$ | pentafluoroethyl trifluorovinyl ether |
| PMVE | $CF_2=CFOCF_3$ | trifluoromethyl trifluorovinyl ether |

The compounds listed in Table 2 and Table 3 are available commercially or may be prepared by processes known in the art or as described herein.

1,1,1,4,4-pentafluoro-2-butene may be prepared from 1,1,1,2,4,4-hexafluorobutane ($CHF_2CH_2CHFCF_3$) by dehydrofluorination over solid KOH in the vapor phase at room temperature. The synthesis of 1,1,1,2,4,4-hexafluorobutane is described in U.S. Pat. No. 6,066,768, incorporated herein by reference.

1,1,1,4,4,4-hexafluoro-2-butene may be prepared from 1,1,1,4,4,4-hexafluoro-2-iodobutane ($CF_3CHICH_2CF_3$) by reaction with KOH using a phase transfer catalyst at about 60° C. The synthesis of 1,1,1,4,4,4-hexafluoro-2-iodobutane may be carried out by reaction of perfluoromethyl iodide ($CF_3I$) and 3,3,3-trifluoropropene ($CF_3CH=CH_2$) at about 200° C. under autogenous pressure for about 8 hours.

3,4,4,5,5,5-hexafluoro-2-pentene may be prepared by dehydrofluorination of 1,1,1,2,2,3,3-heptafluoropentane ($CF_3CF_2CF_2CH_2CH_3$) using solid KOH or over a carbon catalyst at 200-300° C. 1,1,1,2,2,3,3-heptafluoropentane may be prepared by hydrogenation of 3,3,4,4,5,5,5-heptafluoro-1-pentene ($CF_3CF_2CF_2CH=CH_2$).

1,1,1,2,3,4-hexafluoro-2-butene may be prepared by dehydrofluorination of 1,1,1,2,3,3,4-heptafluorobutane ($CH_2FCF_2CHFCF_3$) using solid KOH.

1,1,1,2,4,4-hexafluoro-2-butene may be prepared by dehydrofluorination of 1,1,1,2,2,4,4-heptafluorobutane ($CHF_2CH_2CF_2CF_3$) using solid KOH.

1,1,1,3,4,4-hexafluoro2-butene may be prepared by dehydrofluorination of 1,1,1,3,3,4,4-heptafluorobutane ($CF_3CH_2CF_2CHF_2$) using solid KOH.

1,1,1,2,4-pentafluoro-2-butene may be prepared by dehydrofluorination of 1,1,1,2,2,3-hexafluorobutane ($CH_2FCH_2CF_2CF_3$) using solid KOH.

1,1,1,3,4-pentafluoro-2-butene may be prepared by dehydrofluorination of 1,1,1,3,3,4-hexafluorobutane ($CF_3CH_2CF_2CH_2F$) using solid KOH.

1,1,1,3-tetrafluoro-2-butene may be prepared by reacting 1,1,1,3,3-pentafluorobutane ($CF_3CH_2CF_2CH_3$) with aqueous KOH at 120° C.

1,1,1,4,4,5,5,5-octafluoro-2-pentene may be prepared from ($CF_3CHICH_2CF_2CF_3$) by reaction with KOH using a phase transfer catalyst at about 60° C. The synthesis of 4-iodo-1,1,1,2,2,5,5,5-octafluoropentane may be carried out by reaction of perfluoroethyliodide ($CF_3CF_2I$) and 3,3,3-trifluoropropene at about 200° C. under autogenous pressure for about 8 hours.

1,1,1,2,2,5,5,6,6,6-decafluoro-3-hexene may be prepared from 1,1,1,2,2,5,5,6,6,6-decafluoro-3-iodohexane ($CF_3CF_2CHICH_2CF_2CF_3$) by reaction with KOH using a phase transfer catalyst at about 60° C. The synthesis of 1,1,1,2,2,5,5,6,6,6-decafluoro-3-iodohexane may be carried out by reaction of perfluoroethyliodide ($CF_3CF_2I$) and 3,3,4,4,4-pentafluoro-1-butene ($CF_3CF_2CH=CH_2$) at about 200° C. under autogenous pressure for about 8 hours.

1,1,1,4,5,5,5-heptafluoro-4-(trifluoromethyl)-2-pentene may be prepared by the dehydrofluorination of 1,1,1,2,5,5,5-heptafluoro-4-iodo-2-(trifluoromethyl)-pentane ($CF_3CHICH_2CF(CF_3)_2$) with KOH in isopropanol. $CF_3CHICH_2CF(CF_3)_2$ is made from reaction of $(CF_3)_2CFI$ with $CF_3CH=CH_2$ at high temperature, such as about 200° C.

1,1,1,4,4,5,5,6,6,6-decafluoro-2-hexene may be prepared by the reaction of 1,1,1,4,4,4-hexafluoro-2-butene ($CF_3CH=CHCF_3$) with tetrafluoroethylene ($CF_2=CF_2$) and antimony pentafluoride ($SbF_5$).

2,3,3,4,4-pentafluoro-1-butene may be prepared by dehydrofluorination of 1,1,2,2,3,3-hexafluorobutane over fluorided alumina at elevated temperature.

2,3,3,4,4,5,5,5-ocatafluoro-1-pentene may be prepared by dehydrofluorination of 2,2,3,3,4,4,5,5,5-nonafluoropentane over solid KOH.

1,2,3,3,4,4,5,5-octafluoro-1-pentene may be prepared by dehydrofluorination of 2,2,3,3,4,4,5,5,5-nonafluoropentane over fluorided alumina at elevated temperature.

Many of the compounds of Formula 5, Formula 6, Table 1, Table 2, and Table 3 exist as different configurational isomers or stereoisomers. When the specific isomer is not designated, the present invention is intended to include all single configurational isomers, single stereoisomers, or any combination thereof. For instance, F11E is meant to represent the E-isomer, Z-isomer, or any combination or mixture of both isomers in any ratio. As another example, HFC-1225ye is meant to represent the E-isomer, Z-isomer, or any combination or mixture of both isomers in any ratio.

In one embodiment, the hydrofluorocarbon (HFC) refrigerants of the present invention comprise saturated compounds containing carbon, hydrogen, and fluorine. Of particular utility are hydrofluorocarbons having 1-7 carbon atoms and having a normal boiling point of from about −90° C. to about 80° C. Hydrofluorocarbons are commercial products available from a number of sources such as E. I. du Pont de Nemours & Co., Fluoroproducts, Wilmington, Del., 19898, USA, or may be prepared by methods known in the art. Representative hydrofluorocarbon compounds include but are not limited to fluoromethane ($CH_3F$, HFC-41), difluoromethane ($CH_2F_2$, HFC-32), trifluoromethane ($CHF_3$, HFC-23), pentafluoroethane ($CF_3CHF_2$, HFC-125), 1,1,2,2-tetrafluoroethane ($CHF_2CHF_2$, HFC-134), 1,1,1,2-tetrafluoroethane ($CF_3CH_2F$, HFC-134a), 1,1,1-trifluoroethane ($CF_3CH_3$, HFC-143a), 1,1-difluoroethane ($CHF_2CH_3$, HFC-152a), fluoroethane ($CH_3CH_2F$, HFC-161), 1,1,1,2,2,3,3-heptafluoropropane ($CF_3CF_2CHF_2$, HFC-227ca), 1,1,1,2,3,3,3-heptafluoropropane ($CF_3CHFCF_3$, HFC-227ea), 1,1,2,2,3,3,-hexafluoropropane ($CHF_2CF_2CHF_2$, HFC-236ca), 1,1,1,2,2,3-hexafluoropropane ($CF_3CF_2CH_2F$, HFC-236cb), 1,1,1,2,3,3-hexafluoropropane ($CF_3CHFCHF_2$, HFC-236ea), 1,1,1,3,3,3-hexafluoropropane ($CF_3CH_2CF_3$, HFC-236fa), 1,1,2,2,3-pentafluoropropane ($CHF_2CF_2CH_2F$, HFC-245ca), 1,1,1,2,2-pentafluoropropane ($CF_3CF_2CH_3$, HFC-245cb), 1,1,2,3,3-pentafluoropropane ($CHF_2CHFCHF_2$, HFC-245ea), 1,1,1,2,3-pentafluoropropane ($CF_3CHFCH_2F$, HFC-245eb), 1,1,1,3,3-pentafluoropropane ($CF_3CH_2CHF_2$, HFC-245fa), 1,2,2,3-tetrafluoropropane ($CH_2FCF_2CH_2F$, HFC-254ca), 1,1,2,2-tetrafluoropropane ($CHF_2CF_2CH_3$, HFC-254cb), 1,1,2,3-tetrafluoropropane ($CHF_2CHFCH_2F$, HFC-254ea), 1,1,1,2- tetrafluoropropane (CF$_3$CHFCH$_3$, HFC-254eb), 1,1,3,3-tetrafluoropropane (CHF$_2$CH$_2$CHF$_2$, HFC-254fa), 1,1,1,3-tetrafluoropropane (CF$_3$CH$_2$CH$_2$F, HFC-254fb), 1,1,1-trifluoropropane (CF$_3$CH$_2$CH$_3$, HFC-263fb), 2,2-difluoropropane (CH$_3$CF$_2$CH$_3$, HFC-272ca), 1,2-difluoropropane (CH$_2$FCHFCH$_3$, HFC-272ea), 1,3-difluoropropane (CH$_2$FCH$_2$CH$_2$F, HFC-272fa), 1,1-difluoropropane (CHF$_2$CH$_2$CH$_3$, HFC-272fb), 2-fluoropropane (CH$_3$CHFCH$_3$, HFC-281ea), 1-fluoropropane (CH$_2$FCH$_2$CH$_3$, HFC-281fa), 1,1,2,2,3,3,4,4-octafluorobutane (CHF$_2$CF$_2$CF$_2$CHF$_2$, HFC-338 pcc), 1,1,1,2,2,4,4,4-octafluorobutane (CF$_3$CH$_2$CF$_2$CF$_3$, HFC-338mf), 1,1,1,3,3-pentafluorobutane (CF$_3$CH$_2$CHF$_2$, HFC-365mfc), 1,1,1,2,3,4,4,5,5,5-decafluoropentane (CF$_3$CHFCHFCF$_2$CF$_3$, HFC-43-10mee), and 1,1,1,2,2,3,4,5,5,6,6,7,7,7-tetradecafluoroheptane (CF$_3$CF$_2$CHFCHFCF$_2$CF$_2$CF$_3$, HFC-63-14mee).

In one embodiment, the hydrocarbon refrigerants of the present invention comprise compounds having only carbon and hydrogen. Of particular utility are compounds having 3-7 carbon atoms. Hydrocarbons are commercially available through numerous chemical suppliers. Representative hydrocarbons include but are not limited to propane, n-butane, isobutane, cyclobutane, n-pentane, 2-methylbutane, 2,2-dimethylpropane, cyclopentane, n-hexane, 2-methylpentane, 2,2-dimethylbutane, 2,3-dimethylbutane, 3-methylpentane, cyclohexane, n-heptane, and cycloheptane.

Refrigerants may also comprise hydrocarbons containing heteroatoms, such as dimethylether (DME, CH$_3$OCH$_3$), and may be included as refrigerants of the present invention. DME is commercially available.

Refrigerants may also comprise carbon dioxide (CO$_2$), which is commercially available from various sources or may be prepared by methods known in the art.

Refrigerants may also comprise ammonia (NH$_3$), which is commercially available from various sources or may be prepared by methods known in the art.

Of particular note are compositions comprising:
HFC-1225ye and CF$_3$I;
HFC-1234yf and CF$_3$I;
HFC-1234yf, HFC-125, and CF$_3$I;
HFC-1234yf, HFC-134a, and CF$_3$I;
HFC-1234yf, HFC-152a, and CF$_3$I;
HFC-1234yf, HFC-32, and CF$_3$I;
HFC-1225ye, HFC-152a, and CF$_3$I;
trans-HFC-1234ze, HFC-152a, and CF$_3$I;
HFC-1225ye, HFC-134a, HFC-32, and CF$_3$I;
HFC-1225ye, HFC-1234yf, HFC-134a, HFC-32, and CF$_3$I;
HFC-1225ye, HFC-1234yf, HFC-32, and CF$_3$I;
HFC-1225ye, HFC-1234yf, and HFC-32;
HFC-1225ye, HFC-1234yf, HFC-32, and CF$_3$I; and
HFC-1225ye, HFC-1234yf and HFC-125.

Additional compositions comprising fluoroolefins as disclosed in U.S. patent application Ser. No. 11/369,227 filed Mar. 2, 2006; U.S. patent application Ser. No. 11/393,109 filed Mar. 30, 2006; and U.S. patent application Ser. No. 11/486,791 filed Jul. 13, 2006; are intended to be included within the scope refrigerants that may be added to the compositions comprising iodotrifluoromethane.

The compositions of the present invention may further comprise at least one lubricant. Lubricants of the present invention comprise those suitable for use with refrigeration or air-conditioning apparatus. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21, herein incorporated by reference. Lubricants of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic or ring structure saturated hydrocarbons, which may be paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and naphthenes, silicones, and poly-alpha-olefins. Representative conventional lubricants of the present invention are the commercially available BVM 100 N (paraffinic mineral oil sold by BVA Oils), Suniso® 3GS and Suniso® 5GS (naphthenic mineral oil sold by Crompton Co.), Sontex® 372LT (naphthenic mineral oil sold by Pennzoil), Calumet® RO-30 (naphthenic mineral oil sold by Calument Lubricants), Zerol® 75, Zerol® 150 and Zerol® 500 (linear alkylbenzenes sold by Shrieve Chemicals) and HAB 22 (branched alkylbenzene sold by Nippon Oil).

Lubricants of the present invention further comprise those which have been designed for use with hydrofluorocarbon refrigerants and are miscible with compositions of the present invention under typical compression refrigeration and air-conditioning apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), and polyvinyl ethers (PVEs) and polycarbonates (PCs) including but not limited to 2320F (from Mitsui Petrochemicals, Ltd. of Japan).

Lubricants of the present invention are selected by considering a given compressor's requirements and the environment to which the lubricant will be exposed.

The compositions of the present invention may be prepared by any convenient method to combine the desired amount of the individual components. A preferred method is to weigh the desired component amounts and thereafter combine the components in an appropriate vessel. Agitation may be used, if desired.

Any suitable effective amount of stabilizer may be used in the compositions comprising iodotrifluoromethane. As described herein, the phrase "effective amount" refers to an amount of stabilizer of the present invention which, when added to a composition comprising iodotrifluoromethane, results in a composition that will not degrade to produce as great a reduction in refrigeration performance when in use in a cooling apparatus as compared to the composition without stabilizer. Such effective amounts of stabilizer may be determined by way of testing under the conditions of standard test ASHRAE/ANSI (American Society of Heating, Refrigerating and Air-Conditioning Engineers and American National Standards Institute) 97-2004. In a certain embodiment of the present invention, an effective amount may be said to be that amount of stabilizer that when combined with a composition comprising iodotrifluoromethane allows a cooling apparatus utilizing said composition comprising iodotrifluoromethane to perform at the same level of refrigeration performance and cooling capacity as if a composition comprising 1,1,1,2-tetrafluoroethane (R-134a), or other standard refrigerant (R-12, R-22, R-502, R-507A, R-508, R401A, R401B, R402A, R402B, R408, R-410A, R-404A, R407C, R-413A, R-417A, R-422A, R-422B, R-422O, R-422D, R-423, R-114, R-11, R-113, R-123, R-124, R236fa, or R-245fa) depending upon what refrigerant may have been used in a similar system in the past, were being utilized as the working fluid.

In one embodiment an effective amount of stabilizer for use in the present invention comprise from about 0.001 weight percent to about 10 weight percent stabilizer based on the total weight of composition comprising iodotrifluoromethane as described herein. In another embodiment an effective amount of stabilizer comprises from about 0.01 weight percent to about 5 weight percent stabilizer. In another embodiment, an effective amount of stabilizer comprises from about 0.3 weight percent to about 4 weight percent stabilizer. In yet another embodiment, an effective amount of stabilizer comprises from about 0.3 weight percent to about 1 weight percent stabilizer based on the total weight of compositions comprising iodotrifluoromethane as described herein.

The present invention further relates to a method for stabilizing a composition comprising iodotrifluoromethane, said method comprising adding an effective amount of a stabilizer composition wherein said stabilizer composition comprises at least one stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephalic acid, diphenyl terephalic acid, ionic liquids, and mixtures thereof.

The present invention further relates to a process for producing cooling comprising condensing a composition comprising iodotrifluoromethane and an effective amount at least one stabilizer selected from the group consisting of phenols, thiophosphates, butylated triphenylphosphorothionates, organo phosphates, phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephalic acid, diphenyl terephalic acid, ionic liquids, and mixtures thereof, and thereafter evaporating said composition in the vicinity of a body to be cooled.

A body to be cooled may be any space, location or object requiring refrigeration or air-conditioning. In stationary applications the body may be the interior of a structure, i.e. residential or commercial, or a storage location for perishables, such as food or pharmaceuticals. For mobile refrigeration applications the body may be incorporated into a transportation unit for the road, rail, sea or air. Certain refrigeration systems operate independently with regards to any moving carrier, these are known as "intermodal" systems. Such intermodal systems include "containers" (combined sea/land transport) as well as "swap bodies" (combined road and rail transport).

The present invention further relates to a process for producing heat comprising condensing a composition comprising iodotrifluoromethane and an effective amount of at least one stabilizer selected from the group consisting of phenols, thiophosphates, butylated triphenylphosphorothionates, organo phosphates, phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephalic acid, diphenyl terephalic acid, ionic liquids, and mixtures thereof, in the vicinity of a body to be heated, and thereafter evaporating said composition.

A body to be heated may be any space, location or object requiring heat. These may be the interior of structures either residential or commercial in a similar manner to the body to be cooled. Additionally, mobile units as described for cooling may be similar to those requiring heating. Certain transport units require heating to prevent the material being transported from solidifying inside the transport container.

It is not uncommon for air to leak into a refrigeration, air-conditioning system or heat pump. The oxygen in the air may lead to oxidation of certain components of the system including the working fluid. Thus, in another embodiment, also disclosed is a method for reducing degradation of a composition comprising iodotrifluoromethane, wherein said degradation is caused by the presence of inadvertent air; for example in a refrigeration, air-conditioning or heat pump system, said method comprising adding at least one stabilizer selected from the group consisting of phenols, thiophosphates, butylated triphenylphosphorothionates, organo phosphates, phosphites, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephalic acid, diphenyl terephalic acid, ionic liquids, and mixtures thereof to the composition comprising iodotrifluoromethane.

EXAMPLES

For the examples the following descriptions apply:
PAG 488 is Ucon® PAG 488, a polyalkylene glycol lubricant from Dow Chemical Company.
5GS is Suniso® 5GS, a naphthenic mineral oil from Crompton.
Irgalube® 63 is a dithiophosphate from Ciba.
Irgalube® 232 is a butylated triphenyl phosphorothionate from Ciba.
Irgalube® 349 is a mixture of amine phosphates from Ciba.
Irgalube® 350 and Irgalube® 353 are a dialkyl dithiophosphate ester from Ciba.
OXT-101 is 3-ethyl-3-hydroxymethyloxetane from Toagosei Company.
BHT is butylated hydroxyl toluene (or 2,6-di-tert-butyl-4-methylphenol).
Tinuvin® 622LD is a hindered amine from Ciba.
HP-136 is 5,7-di-t-butyl-3-(3-4-dimethylphenyl)-3H-benzofuran-2-one from Ciba.
Emim-BF$_4$ is 1-ethyl-3-methylimidazolium tetrafluoroborate available from Fluka (Sigma-Aldrich).

Example 1

Refrigeration System Chemical Stability

A chemical stability test is run under conditions described in ASHRAE/ANSI (American Society of Heating, Refrigerating and Air-Conditioning Engineers and American National Standards Institute) Standard 97-2004 to determine chemical stability of the compositions of the present invention as compared to compositions with no stabilizers.

The procedure is given here:
1. Metal coupons of copper, aluminum and steel are placed in thick walled glass tubes.
2. Refrigerant samples, including lubricant, are prepared with and without stabilizers, and optionally with 2 volume % air added to the tube.
3. Samples are added to the sealed tubes as described in the standard.
4. The tubes are sealed with a glass blowing torch.

5. The sealed tubes are heated in an oven for 14 days at the specified temperature.
6. After 14 days, the sealed tubes are removed from the oven and examined for metal/liquid appearance, proper volume of liquid, appearance of glass, and absence of extraneous materials such as metal fines.
7. Ratings are assigned to each sample based upon the following criteria.
0: No observable change
1=light changes on coupons and liquids;
2=light to moderate changes on coupons or liquids;
3=moderate to significant changes on coupons or liquids;
4=severe changes on coupons or liquids;
5=extreme changes on coupons or liquids, i.e. black liquid or coked with many deposits.

Table 4 lists estimated results for stabilizers of the present invention as compared to unstabilized compositions. The lubricant is combined with the refrigerant to produce a composition that was 50 wt % refrigerant and 50 wt % lubricant.

TABLE 4

| Lubricant | Stabilizer | Stabilizer weight percent in Refrigerant/lubricant mixture: | With 2 vol % Air | Temp, (° C.) | Results-Rating |
|---|---|---|---|---|---|
| $CF_3I$ | PAG 488 | none | 0 | yes | 130 | 5 |
| $CF_3I$ | PAG 488 | none | 0 | no | 130 | 4 |
| $CF_3I$ | PAG 488 | Irgalube ® 63 | 2 | yes | 130 | 3 |
| $CF_3I$ | PAG 488 | Irgalube ® 63 | 2 | no | 130 | 2 |
| $CF_3I$ | PAG 488 | Irgalube ® 232 | 2 | yes | 130 | 3 |
| $CF_3I$ | PAG 488 | Irgalube ® 232 | 2 | no | 130 | 2 |
| $CF_3I$ | PAG 488 | Irgalube ® 349 | 2 | yes | 130 | 3 |
| $CF_3I$ | PAG 488 | Irgalube ® 349 | 2 | no | 130 | 2 |
| $CF_3I$ | PAG 488 | Irgalube ® 350 | 2 | yes | 130 | 3 |
| $CF_3I$ | PAG 488 | Irgalube ® 350 | 2 | no | 130 | 2 |
| $CF_3I$ | PAG 488 | Irgalube ® 353 | 2 | yes | 130 | 3 |
| $CF_3I$ | PAG 488 | Irgalube ® 353 | 2 | no | 130 | 2 |
| $CF_3I$ | PAG 488 | d-limonene | 2 | yes | 130 | 3 |
| $CF_3I$ | PAG 488 | d-limonene | 2 | no | 130 | 2 |
| $CF_3I$ | PAG 488 | naphthalene | 2 | yes | 130 | 3 |
| $CF_3I$ | PAG 488 | naphthalene | 2 | no | 130 | 2 |
| $CF_3I$ | PAG 488 | anisole | 2 | yes | 130 | 3 |
| $CF_3I$ | PAG 488 | anisole | 2 | no | 130 | 2 |
| $CF_3I$ | PAG 488 | Trifluoromethyloxirane | 2 | yes | 130 | 3 |
| $CF_3I$ | PAG 488 | Trifluoromethyloxirane | 2 | no | 130 | 2 |
| $CF_3I$ | PAG 488 | OXT-101 | 2 | yes | 130 | 3 |
| $CF_3I$ | PAG 488 | OXT-101 | 2 | no | 130 | 2 |
| $CF_3I$ | PAG 488 | ascorbic acid | 2 | yes | 130 | 3 |
| $CF_3I$ | PAG 488 | ascorbic acid | 2 | no | 130 | 2 |
| $CF_3I$ | PAG 488 | methyl mercaptan | 2 | yes | 130 | 3 |
| $CF_3I$ | PAG 488 | methyl mercaptan | 2 | no | 130 | 2 |
| $CF_3I$ | PAG 488 | gamma-undecalactone | 2 | yes | 130 | 3 |
| $CF_3I$ | PAG 488 | gamma-undecalactone | 2 | no | 130 | 2 |
| $CF_3I$ | PAG 488 | benzyl phenyl sulfide | 2 | yes | 130 | 3 |
| $CF_3I$ | PAG 488 | benzyl phenyl sulfide | 2 | no | 130 | 2 |
| $CF_3I$ | PAG 488 | 1,2-butylene oxide | 2 | yes | 130 | 3 |
| $CF_3I$ | PAG 488 | 1,2-butylene oxide | 2 | no | 130 | 2 |
| $CF_3I$ | PAG 488 | diisopropylamine | 2 | yes | 130 | 3 |
| $CF_3I$ | PAG 488 | diisopropylamine | 2 | no | 130 | 2 |
| $CF_3I$ | PAG 488 | nitromethane | 2 | yes | 130 | 3 |
| $CF_3I$ | PAG 488 | nitromethane | 2 | no | 130 | 2 |
| $CF_3I$ | PAG 488 | tris(trimethylsilyl)silane | 2 | yes | 130 | 3 |
| $CF_3I$ | PAG 488 | tris(trimethylsilyl)silane | 2 | no | 130 | 2 |
| $CF_3I$ | PAG 488 | tocopherol | 2 | yes | 130 | 3 |
| $CF_3I$ | PAG 488 | tocopherol | 2 | no | 130 | 2 |
| $CF_3I$ | PAG 488 | hydroquinone | 2 | yes | 130 | 3 |
| $CF_3I$ | PAG 488 | hydroquinone | 2 | no | 130 | 2 |
| $CF_3I$ | PAG 488 | BHT | 2 | yes | 130 | 3 |
| $CF_3I$ | PAG 488 | BHT | 2 | no | 130 | 2 |
| $CF_3I$ | PAG 488 | Divinyl terephthalic acid | 2 | yes | 130 | 3 |
| $CF_3I$ | PAG 488 | Divinyl terephthalic acid | 2 | no | 130 | 2 |
| $CF_3I$ | PAG 488 | Tinuvin ® 622LD | 2 | yes | 130 | 3 |
| $CF_3I$ | PAG 488 | Tinuvin ® 622LD | 2 | no | 130 | 2 |
| $CF_3I$ | PAG 488 | 2-hydroxy-5-methoxybenzophenone | 2 | yes | 130 | 3 |
| $CF_3I$ | PAG 488 | 2-hydroxy-5-methoxybenzophenone | 2 | no | 130 | 2 |
| $CF_3I$ | PAG 488 | 2-hydroxybenzophenone | 2 | yes | 130 | 3 |
| $CF_3I$ | PAG 488 | 2-hydroxybenzophenone | 2 | no | 130 | 2 |
| $CF_3I$ | PAG 488 | 2,5-dihydroxybenzophenone | 2 | yes | 130 | 3 |
| $CF_3I$ | PAG 488 | 2,5-dihydroxybenzophenone | 2 | no | 130 | 2 |
| $CF_3I$ | PAG 488 | 2,5-dimethylbenzophenone | 2 | yes | 130 | 3 |

TABLE 4-continued

| Lubricant | Stabilizer | Stabilizer weight percent in Refrigerant/lubricant mixture: | With 2 vol % Air | Temp, (° C.) | Results-Rating |
|---|---|---|---|---|---|
| $CF_3I$ | PAG 488 | 2,5-dimethylbenzophenone | 2 | no | 130 | 2 |
| $CF_3I$ | PAG 488 | 3,5-diaminobenzophenone | 2 | yes | 130 | 3 |
| $CF_3I$ | PAG 488 | 3,5-diaminobenzophenone | 2 | no | 130 | 2 |
| $CF_3I$ | PAG 488 | HP-136 | 2 | yes | 130 | 3 |
| $CF_3I$ | PAG 488 | HP-136 | 2 | no | 130 | 2 |
| $CF_3I$ | PAG 488 | Emim-$BF_4$ | 2 | yes | 130 | 3 |
| $CF_3I$ | PAG 488 | Emim-$BF_4$ | 2 | No | 130 | 2 |

Estimates indicate improved chemical stability of $CF_3I$ containing compositions in the presence of stabilizers as disclosed herein with and without air present.

Example 2

Refrigeration System Chemical Stability

A chemical stability test was run under conditions described in ASHRAE/ANSI (American Society of Heating, Refrigerating and Air-Conditioning Engineers and American National Standards Institute) Standard 97-2004 to determine chemical stability of the stabilized compositions of the present invention as compared to compositions with no stabilizers.

The procedure is given here:
1. Metal coupons of copper, aluminum and steel were placed in thick walled glass tubes, when included in the test.
2. Refrigerant samples, including lubricant, were prepared with and without stabilizers, and optionally with 2 volume % air added to the tube.
3. Samples were added to the sealed tubes as described in the standard.
4. The tubes were sealed with a glass blowing torch.
5. The sealed tubes were heated in an oven for 14 days at the specified temperature.
6. After 14 days, the sealed tubes were removed from the oven and examined for metal/liquid appearance, proper volume of liquid, appearance of glass, and absence of extraneous materials such as metal fines.
7. Ratings were assigned to each sample based upon the following criteria:
   0: No observable change;
   1=light changes on coupons and liquids;
   2=light to moderate changes on coupons or liquids;
   3=moderate to significant changes on coupons or liquids;
   4=severe changes on coupons or liquids;
   5=extreme changes on coupons or liquids, i.e. black liquid or coked with many deposits.

Table 5 lists results for stabilizers of the present invention as compared to unstabilized compositions. The lubricant is combined with the refrigerant to produce a composition that was 50 wt % refrigerant and 50 wt % lubricant.

TABLE 5

| Refrigerant 50/50 wt/wt blend | Lubricant | Stabilizer | Stabilizer concentration in Lubricant | Metal coupons (yes/no) Cu, Fe, Al | Temp., (° C.) | Rating |
|---|---|---|---|---|---|---|
| $CF_3I$/152a | 5GS | Irgalube ® 63 | 0.50% | Yes | 130 | 4 |
| $CF_3I$/152a | 5GS | Irgalube ® 63 | 0.50% | No | 130 | 3 |
| $CF_3I$/152a | 5GS | Irgalube ® 63 | 0.50% | Yes | 110 | 2 |
| $CF_3I$/152a | 5GS | Irgalube ® 63 | 0.50% | No | 110 | 1 |
| $CF_3I$/152a | 5GS | Irgalube ® 232 | 0.50% | Yes | 130 | 4 |
| $CF_3I$/152a | 5GS | Irgalube ® 232 | 0.50% | No | 130 | 3 |
| $CF_3I$/152a | 5GS | Irgalube ® 232 | 0.50% | Yes | 110 | 2 |
| $CF_3I$/152a | 5GS | Irgalube ® 232 | 0.50% | No | 110 | 1 |
| $CF_3I$/152a | 5GS | Irgalube ® 349 | 0.50% | Yes | 130 | 4 |
| $CF_3I$/152a | 5GS | Irgalube ® 349 | 0.50% | No | 130 | 3 |
| $CF_3I$/152a | 5GS | Irgalube ® 349 | 0.50% | Yes | 110 | 2 |
| $CF_3I$/152a | 5GS | Irgalube ® 349 | 0.50% | No | 110 | 1 |

TABLE 5-continued

| Refrigerant 50/50 wt/wt blend | Lubricant | Stabilizer | Stabilizer concentration in Lubricant | Metal coupons (yes/no) Cu, Fe, Al | Temp., (° C.) | Rating |
|---|---|---|---|---|---|---|
| CF$_3$I/152a | 5GS | Irgalube ® 353 | 0.50% | Yes | 130 | 4 |
| CF$_3$I/152a | 5GS | Irgalube ® 353 | 0.50% | No | 130 | 3 |
| CF$_3$I/152a | 5GS | Irgalube ® 353 | 0.50% | Yes | 110 | 2 |
| CF$_3$I/152a | 5GS | Irgalube ® 353 | 0.50% | No | 110 | 1 |
| CF$_3$I/152a | 5GS | d-limonene | 0.50% | Yes | 130 | 4 |
| CF$_3$I/152a | 5GS | d-limonene | 0.50% | No | 130 | 3 |
| CF$_3$I/152a | 5GS | d-limonene | 0.50% | Yes | 110 | 2 |
| CF$_3$I/152a | 5GS | d-limonene | 0.50% | No | 110 | 1 |
| CF$_3$I/152a | 5GS | BHT | 0.50% | Yes | 130 | 4 |
| CF$_3$I/152a | 5GS | BHT | 0.50% | No | 130 | 3 |
| CF$_3$I/152a | 5GS | BHT | 0.50% | Yes | 110 | 2 |
| CF$_3$I/152a | 5GS | BHT | 0.50% | No | 110 | 1 |
| CF$_3$I/152a | 5GS | None | 0 | Yes | 130 | 5 |
| CF$_3$I/152a | 5GS | None | 0 | No | 130 | 4 |
| CF$_3$I/152a | 5GS | None | 0 | Yes | 110 | 3 |
| CF$_3$I/152a | 5GS | None | 0 | No | 110 | 2 |
| CF$_3$I/152a | 5GS | None | 0 | Yes | room temp | 0 |
| CF$_3$I/152a | 5GS | None | 0 | No | room temp | 0 |

Results show improved chemical stability of CF$_3$I and HFC-152a containing compositions in the presence of stabilizers as disclosed herein with and without air present.

Example 3

Refrigeration System Chemical Stability

A chemical stability test is run under conditions described in ASHRAE/ANSI (American Society of Heating, Refrigerating and Air-Conditioning Engineers and American National Standards Institute) Standard 97-2004, as described for EXAMPLE 1, to determine chemical stability of the stabilized compositions of the present invention as compared to compositions with no stabilizers.

Table 6 lists estimated results for stabilizers of the present invention as compared to unstabilized compositions. The lubricant is combined with the refrigerant to produce a composition that was 50 wt % refrigerant and 50 wt % lubricant.

TABLE 6

| Refrigerant | Lubricant | Stabilizer | Stabilizer weight percent in Refrigerant/ lubricant mixture: | With 2 vol % Air | Temp, (° C.) | Rating |
|---|---|---|---|---|---|---|
| CF$_3$I | PAG 488 | none | 0 | Yes | 130 | 5 |
| CF$_3$I | PAG 488 | none | 0 | No | 130 | 4 |
| CF$_3$I | PAG 488 | Tocopherol | 2 | Yes | 130 | 3 |
| CF$_3$I | PAG 488 | Tocopherol + Emim BF$_4$ | 2 | Yes | 130 | 1 |

Estimates indicate improved chemical stability of CF$_3$I containing compositions in the presence of stabilizers as disclosed herein with and without air present. An even greater effect is indicated for the combination of tocopherol/Emim BF$_4$ when combined but present in total at the same concentration as tocopherol alone.

What is claimed is:

1. A composition comprising iodotrifluoromethane and an effective amount of at least one stabilizer selected from the group consisting of aryl alkyl ethers, thiols, lactones, thioethers, nitromethane, alkylsilanes, benzophenone derivatives, divinyl terephthalic acid, diphenyl terephthalic acid, and mixtures thereof.

2. The composition of claim 1 further comprising at least one refrigerant selected from the group consisting of fluoroolefins, hydrofluorocarbons, hydrocarbons, dimethyl ether, carbon dioxide, ammonia, and mixtures thereof.

3. The composition of claim 2 wherein said fluoroolefin is at least one compound selected from the group consisting of the (i) fluoroolefins of the formula E- or Z—R$^1$CH=CHR$^2$, wherein R$^1$ and R$^2$ are, independently, C$_1$ to C$_6$ perfluoroalkyl groups, and wherein the total number of carbons in the compound is at least 5;

(ii) cyclic fluoroolefins of the formula cyclo-[CX=CY(CZW)$_n$—], wherein X, Y, Z, and W, independently, are H or F, and n is an integer from 2 to 5; and (iii) fluoroolefins selected from the group consisting of:
1,2,3,3,3-pentafluoro-1-propene (CF$_3$CF=CHF);
1,1,3,3,3-pentafluoro-1-propene (CF$_3$CH=CF$_2$);

1,1,2,3,3-pentafluoro-1-propene (CHF$_2$CF=CF$_2$);
1,2,3,3-tetrafluoro-1-propene (CHF$_2$CF=CHF);
2,3,3,3-tetrafluoro-1-propene (CF$_3$CF=CH$_2$);
1,1,2,3-tetrafluoro-1-propene (CH$_2$FCF=CF$_2$);
1,1,3,3-tetrafluoro-1-propene (CHF$_2$CH=CF$_2$);
2,3,3-trifluoro-1-propene (CHF$_2$CF=CH$_2$);
3,3,3-trifluoro-1-propene (CF$_3$CH=CH$_2$);
1,1,2-trifluoro-1-propene (CH$_3$CF=CF$_2$);
1,2,3-trifluoro-1-propene (CH$_2$FCF=CF$_2$);
1,1,3-trifluoro-1-propene (CH$_2$FCH=CF$_2$);
1,3,3-trifluoro-1-propene (CHF$_2$CH=CHF);
1,1,1,2,3,4,4,4-octafluoro-2-butene (CF$_3$CF=CFCF$_3$);
1,1,2,3,3,4,4,4-octafluoro-1-butene (CF$_3$CF$_2$CF=CF$_2$);
1,1,1,2,4,4,4-heptafluoro-2-butene (CF$_3$CF=CHCF$_3$);
1,2,3,3,4,4,4-heptafluoro-1-butene (CHF=CFCF$_2$CF$_3$);
1,1,1,2,3,4,4-heptafluoro-2-butene (CHF$_2$CF=CFCF$_3$);
1,3,3,3-tetrafluoro-2-(trifluoromethyl)-1-propene ((CF$_3$)$_2$C=CHF);
1,1,3,3,4,4,4-heptafluoro-1-butene (CF$_2$=CHCF$_2$CF$_3$);
1,1,2,3,4,4,4-heptafluoro-1-butene (CF$_2$=CFCHFCF$_3$);
1,1,2,3,3,4,4-heptafluoro-1-butene (CF$_2$=CFCF$_2$CHF$_2$);
2,3,3,4,4,4-hexafluoro-1-butene (CF$_3$CF$_2$CF=CH$_2$);
1,3,3,4,4,4-hexafluoro-1-butene (CHF=CHCF$_2$CF$_3$);
1,2,3,4,4,4-hexafluoro-1-butene (CHF=CFCHFCF$_3$);
1,2,3,3,4,4-hexafluoro-1-butene (CHF=CFCF$_2$CHF$_2$);
1,1,2,3,4,4-hexafluoro-2-butene (CHF$_2$CF=CFCHF$_2$);
1,1,1,2,3,4-hexafluoro-2-butene (CH$_2$FCF=CFCF$_3$);
1,1,1,2,4,4-hexafluoro-2-butene (CHF$_2$CH=CFCF$_3$);
1,1,1,3,4,4-hexafluoro-2-butene (CF$_3$CH=CFCHF$_2$);
1,1,2,3,3,4-hexafluoro-1-butene (CF$_2$=CFCF$_2$CH$_2$F);
1,1,2,3,4,4-hexafluoro-1-butene (CF$_2$=CFCHFCHF$_2$);
3,3,3-trifluoro-2-(trifluoromethyl)-1-propene (CH$_2$=C(CF$_3$)$_2$);
1,1,1,2,4-pentafluoro-2-butene (CH$_2$FCH=CFCF$_3$);
1,1,1,3,4-pentafluoro-2-butene (CF$_3$CH=CFCH$_2$F);
3,3,4,4,4-pentafluoro-1-butene (CF$_3$CF$_2$CH=CH$_2$);
1,1,1,4,4-pentafluoro-2-butene (CHF$_2$CH=CHCF$_3$);
1,1,1,2,3-pentafluoro-2-butene (CH$_3$CF=CFCF$_3$);
2,3,3,4,4-pentafluoro-1-butene (CH$_2$=CFCF$_2$CHF$_2$);
1,1,2,4,4-pentafluoro-2-butene (CHF$_2$CF=CHCHF$_2$);
1,2,3,3-pentafluoro-1-butene (CH$_3$CF$_2$CF=CF$_2$);
1,1,2,3,4-pentafluoro-2-butene (CH$_2$FCF=CFCHF$_2$);
1,1,3,3,3-pentafluoro-2-methyl-1-propene (CF$_2$=C(CF$_3$)(CH$_3$));
2-(difluoromethyl)-3,3,3-trifluoro-1-propene (CH$_2$=C(CHF$_2$)(CF$_3$));
2,3,4,4-pentafluoro-1-butene (CH$_2$=CFCHFCHF$_2$);
1,2,4,4,4-pentafluoro-1-butene (CHF=CFCH$_2$CF$_3$);
1,3,4,4,4-pentafluoro-1-butene (CHF=CHCHFCF$_3$);
1,3,3,4,4-pentafluoro-1-butene (CHF=CHCF$_2$CHF$_2$);
1,2,3,4,4-pentafluoro-1-butene (CHF=CFCHFCHF$_2$);
3,3,4,4-tetrafluoro-1-butene (CH$_2$=CHCF$_2$CHF$_2$);
1,1-difluoro-2-(difluoromethyl)-1-propene (CF$_2$=C(CHF$_2$)(CH$_3$));
1,3,3,3-tetrafluoro-2-methyl-1-propene (CHF=C(CF$_3$)(CH$_3$));
3,3-difluoro-2-(difluoromethyl)-1-propene (CH$_2$=C(CHF$_2$)$_2$);
1,1,1,2-tetrafluoro-2-butene (CF$_3$CF=CHCH$_3$);
1,1,1,3-tetrafluoro-2-butene (CH$_3$CF=CHCF$_3$);
1,1,1,2,3,4,4,5,5,5-decafluoro-2-pentene (CF$_3$CF=CFCF$_2$CF$_3$);
1,1,2,3,3,4,4,5,5,5-decafluoro-1-pentene (CF$_2$=CFCF$_2$CF$_2$CF$_3$);
1,1,1,4,4-hexafluoro-2-(trifluoromethyl)-2-butene ((CF$_3$)$_2$C=CHCF$_3$);

1,1,1,2,4,4,5,5,5-nonafluoro-2-pentene (CF$_3$CF=CHCF$_2$CF$_3$);
1,1,1,3,4,4,5,5,5-nonafluoro-2-pentene (CF$_3$CH=CFCF$_2$CF$_3$);
1,2,3,3,4,4,5,5,5-nonafluoro-1-pentene (CHF=CFCF$_2$CF$_2$CF$_3$);
1,1,3,3,4,4,5,5,5-nonafluoro-1-pentene (CF$_2$=CHCF$_2$CF$_2$CF$_3$);
1,1,2,3,3,4,4,5,5-nonafluoro-1-pentene (CF$_2$=CFCF$_2$CF$_2$CHF$_2$);
1,1,2,3,4,4,5,5,5-nonafluoro-2-pentene (CHF$_2$CF=CFCF$_2$CF$_3$);
1,1,1,2,3,4,4,5,5-nonafluoro-2-pentene (CF$_3$CF=CFCF$_2$CHF$_2$);
1,1,1,2,3,4,5,5,5-nonafluoro-2-pentene (CF$_3$CF=CFCHFCF$_3$);
1,2,3,4,4,4-hexafluoro-3-(trifluoromethyl)-1-butene (CHF=CFCF(CF$_3$)$_2$);
1,1,2,4,4,4-hexafluoro-3-(trifluoromethyl)-1-butene (CF$_2$=CFCH(CF$_3$)$_2$);
1,1,1,4,4,4-hexafluoro-2-(trifluoromethyl)-2-butene (CF$_3$CH=C(CF$_3$)$_2$);
1,1,3,4,4,4-hexafluoro-3-(trifluoromethyl)-1-butene (CF$_2$=CHCF(CF$_3$)$_2$);
2,3,3,4,4,5,5,5-octafluoro-1-pentene (CH$_2$=CFCF$_2$CF$_2$CF$_3$);
1,2,3,3,4,4,5,5-octafluoro-1-pentene (CHF=CFCF$_2$CF$_2$CHF$_2$);
3,3,4,4,4-pentafluoro-2-(trifluoromethyl)-1-butene (CH$_2$=C(CF$_3$)CF$_2$CF$_3$);
1,1,4,4,4-pentafluoro-3-(trifluoromethyl)-1-butene (CF$_2$=CHCH(CF$_3$)$_2$);
1,3,4,4,4-pentafluoro-3-(trifluoromethyl)-1-butene (CHF=CHCF(CF$_3$)$_2$);
1,1,4,4,4-pentafluoro-2-(trifluoromethyl)-1-butene (CF$_2$=C(CF$_3$)CH$_2$CF$_3$);
3,4,4,4-tetrafluoro-3-(trifluoromethyl)-1-butene ((CF$_3$)$_2$CFCH=CH$_2$);
3,3,4,4,5,5,5-heptafluoro-1-pentene (CF$_3$CF$_2$CF$_2$CH=CH$_2$);
2,3,3,4,4,5,5-heptafluoro-1-pentene (CH$_2$=CFCF$_2$CF$_2$CHF$_2$);
1,1,3,3,5,5,5-heptafluoro-1-butene (CF$_2$=CHCF$_2$CH$_2$CF$_3$);
1,1,1,2,4,4,4-heptafluoro-3-methyl-2-butene (CF$_3$CF=C(CF$_3$)(CH$_3$));
2,4,4,4-tetrafluoro-3-(trifluoromethyl)-1-butene (CH$_2$=CFCH(CF$_3$)$_2$);
1,4,4,4-tetrafluoro-3-(trifluoromethyl)-1-butene (CHF=CHCH(CF$_3$)$_2$);
1,1,1,4-tetrafluoro-2-(trifluoromethyl)-2-butene (CH$_2$FCH=C(CF$_3$)$_2$);
1,1,1,3-tetrafluoro-2-(trifluoromethyl)-2-butene (CH$_3$CF=C(CF$_3$)$_2$);
1,1,1-trifluoro-2-(trifluoromethyl)-2-butene ((CF$_3$)$_2$C=CHCH$_3$);
3,4,4,5,5,5-hexafluoro-2-pentene (CF$_3$CF$_2$CF=CHCH$_3$);
1,1,1,4,4,4-hexafluoro-2-methyl-2-butene (CF$_3$C(CH$_3$)=CHCF$_3$);
3,3,4,5,5,5-hexafluoro-1-pentene (CH$_2$=CHCF$_2$CHFCF$_3$);
4,4,4-trifluoro-3-(trifluoromethyl)-1-butene (CH$_2$=C(CF$_3$)CH$_2$CF$_3$);
1,1,2,3,3,4,4,5,5,6,6,6-dodecafluoro-1-hexene (CF$_3$(CF$_2$)$_3$CF=CF$_2$);
1,1,1,2,2,3,4,5,5,6,6,6-dodecafluoro-3-hexene (CF$_3$CF$_2$CF=CFCF$_2$CF$_3$);

1,1,1,4,4,4-hexafluoro-2,3-bis(trifluoromethyl)-2-butene
    (($CF_3$)$_2$C=C($CF_3$)$_2$);
1,1,1,2,3,4,5,5,5-nonafluoro-4-(trifluoromethyl)-2-pentene (($CF_3$)$_2$CFCF=CFCF$_3$);
1,1,1,4,4,5,5,5-octafluoro-2-(trifluoromethyl)-2-pentene
    (($CF_3$)$_2$C=CHC$_2$F$_5$);
1,1,1,3,4,5,5,5-octafluoro-4-(trifluoromethyl)-2-pentene
    (($CF_3$)$_2$CFCF=CHCF$_3$);
3,3,4,4,5,5,6,6-nonafluoro-1-hexene
    ($CF_3CF_2CF_2CF_2CH=CH_2$);
4,4,4-trifluoro-3,3-bis(trifluoromethyl)-1-butene
    ($CH_2=CHC(CF_3)_3$);
1,1,1,4,4,4-hexafluoro-2-(trifluoromethyl)-3-methyl-2-butene (($CF_3$)$_2$C=C($CH_3$)($CF_3$));
2,3,3,5,5,5-hexafluoro-4-(trifluoromethyl)-1-pentene
    ($CH_2=CFCF_2CH(CF_3)_2$);
1,1,1,2,4,4,5,5,5-nonafluoro-3-methyl-2-pentene
    ($CF_3CF=C(CH_3)CF_2CF_3$);
1,1,1,5,5,5-hexafluoro-4-(trifluoromethyl)-2-pentene
    ($CF_3CH=CHCH(CF_3)_2$);
3,4,4,5,5,6,6,6-octafluoro-2-hexene
    ($CF_3CF_2CF_2CF=CHCH_3$);
3,3,4,4,5,5,6,6-octafluoro1-hexene
    ($CH_2=CHCF_2CF_2CF_2CHF_2$);
1,1,1,4,4-pentafluoro-2-(trifluoromethyl)-2-pentene
    (($CF_3$)$_2$C=CHCF$_2$CH$_3$);
4,4,5,5,5-pentafluoro-2-(trifluoromethyl)-1-pentene
    ($CH_2=C(CF_3)CH_2C_2F_5$);
3,3,4,4,5,5,5-heptafluoro-2-methyl-1-pentene
    ($CF_3CF_2CF_2C(CH_3)=CH_2$);
4,4,5,5,6,6,6-heptafluoro-2-hexene
    ($CF_3CF_2CF_2CH=CHCH_3$);
4,4,5,5,6,6,6-heptafluoro-1-hexene
    ($CH_2=CHCH_2CF_2C_2F_5$);
1,1,1,2,2,3,4-heptafluoro-3-hexene
    ($CF_3CF_2CF=CFC_2H_5$);
4,5,5,5-tetrafluoro-4-(trifluoromethyl)-1-pentene
    ($CH_2=CHCH_2CF(CF_3)_2$);
1,1,1,2,5,5,5-heptafluoro-4-methyl-2-pentene
    ($CF_3CF=CHCH(CF_3)(CH_3)$);
1,1,1,3-tetrafluoro-2-(trifluoromethyl)-2-pentene (($CF_3$)$_2$C=CFC$_2$H$_5$);
1,1,1,2,3,4,4,5,5,6,6,7,7,7-tetradecafluoro-2-heptene
    ($CF_3CF=CFCF_2CF_2C_2F_5$);
1,1,1,2,2,3,4,5,5,6,6,7,7,7-tetradecafluoro-3-heptene
    ($CF_3CF_2CF=CFCF_2C_2F_5$);
1,1,1,3,4,4,5,5,6,6,7,7,7-tridecafluoro-2-heptene
    ($CF_3CH=CFCF_2CF_2C_2F_5$);
1,1,1,2,4,4,5,5,6,6,7,7,7-tridecafluoro-2-heptene
    ($CF_3CF=CHCF_2CF_2C_2F_5$);
1,1,1,2,2,4,5,5,6,6,7,7,7-tridecafluoro-3-heptene
    ($CF_3CF_2CH=CFCF_2C_2F_5$); and
1,1,1,2,2,3,5,5,6,6,7,7,7-tridecafluoro-3-heptene
    ($CF_3CF_2CF=CHCF_2C_2F_5$).

4. The composition of claim 1 further comprising a lubricant selected from the groups consisting of mineral oils, alkylbenzenes, poly-alpha-olefins, silicone oils, polyoxyalkylene glycol ethers, polyol esters, and polyvinylethers and mixtures thereof.

5. The composition of claim 1 wherein:
a. the aryl alkyl ethers are depicted by Formula 2, wherein n is 1, 2 or 3 and R$^1$ is an alkyl group of 1 to 16 carbon atoms;

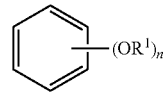

Formula 2 b. the thiols are selected from the group consisting of methanethiol, ethanethiol, Coenzyme A, dimercaptosuccinic acid, (R)-2-(4-methylcyclohex-3-enyl)propane-2-thiol, cysteine, lipoamide, and mixtures thereof;
c. the lactones are selected from the group consisting of gamma-butyrolactone, delta-gluconolactone, gamma-undecalactone, 6,7-dihydro-4(5H)-benzofuranone, 5,7-bis(1,1-dimethylethyl)-3-[2,3(or 3,4)-dimethylphenyl]-2(3H)-benzofuranone, and mixtures thereof;
d. the thioethers are selected from the group consisting of benzyl phenyl sulfide, diphenyl sulfide, dioctadecyl 3,3'-thiodipropionate, didodecyl 3,3'-thiopropionate, and mixtures thereof;
e. the alkyl silanes are selected from the group consisting of bis(dimethylamino)methylsilane, tris(trimethylsilyl)silane, vinyltriethyoxysilane, vinyltrimethoxysilane, and mixtures thereof;
f. the benzophenone derivatives are selected from the group consisting of 2,5-difluorobenzophenone; 2',5'-dihydroxyacetophenone; 2-aminobenzophenone; 2-chlorobenzophenone; 2-fluorobenzophenone; 2-hydroxybenzophenone; 2-methylbenzophenone; 2-amino-4'-chlorobenzophenone; 2-amino-4'-fluorobenzophenone; 2-amino-5-bromo-2'-chlorobenzophenone; 2-amino-5-chlorobenzophenone; 2-amino-5-chloro-2'-fluorobenzophenone; 2-amino-5-nitrobenzophenone; 2-amino-5-nitro-2'-chlorobenzophenone; 2-amino-2',5-dichlorobenzophenone; 2-chloro-4'-fluorobenzophenone; 2-hydroxy-4-methoxybenzophenone; 2-hydroxy-5-chlorobenzophenone; 2-methylamino-5-chlorobenzophenone; 3-methylbenzophenone; 3-nitrobenzophenone; 3-nitro-4'-chloro-4-fluorobenzophenone; 4-chlorobenzophenone; 4-fluorobenzophenone; 4-hydroxybenzophenone; 4-methoxybenzophenone; 4-methylbenzophenone; 4-nitrobenzophenone; 4-phenylbenzophenone; 4-chloro-3-nitrobenzophenone; 4-hydroxy-4'-chlorobenzophenone; 2,4-dihydroxybenzophenone; 2,4-dimethylbenzophenone; 2,5-dimethylbenzophenone; 3,4-diaminobenzophenone; 3,4-dichlorobenzophenone; 3,4-difluorobenzophenone; 3,4-dihydroxybenzophenone; 3,4-dimethylbenzophenone; 4,4'-bis(diethylamine)benzophenone; 4,4'-bis(dimethylamine)benzophenone; 4,4'-dichlorobenzophenone; 4,4'-difluorobenzophenone; 4,4'-dihydroxybenzophenone; 4,4'-dimethoxybenzophenone, and mixtures thereof.

6. The composition of claim 1 comprising:
a. iodotrifluoromethane; and
b. a stabilizer comprising at least one hindered phenol and at least one additional stabilizer selected from the group consisting of lactones, divinyl terephthalic acid, diphenyl terephthalic acid, and mixtures thereof.

7. The composition of claim 1 comprising:
a. iodotrifluoromethane; and
b. a stabilizer comprising at least one amine and at least one additional stabilizer selected from the group consisting of lactones, divinyl terephthalic acid, diphenyl terephthalic acid, and mixtures thereof.

8. The composition of claim 1 comprising:
a. iodotrifluoromethane; and
b. a stabilizer comprising at least one terpene or terpenoid and at least one additional stabilizer selected from the group consisting of lactones, divinyl terephthalic acid, diphenyl terephthalic acid, and mixtures thereof.

9. The composition of claim 1 comprising:
a. iodotrifluoromethane; and
b. a stabilizer comprising at least one epoxide or fluorinated epoxide and at least one additional stabilizer selected from the group consisting of lactones, divinyl terephthalatic acid, diphenyl terephthalic acid, and mixtures thereof.

10. The composition of claim 1 further comprising a metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydrorcinnamate); N,N'-(disalicyclidene)-1,2-propanediamine; ethylenediaminetetraacetic acid and salts thereof; triazoles; benzotriazole, 2-mercaptobenzothiazole, tolutriazole derivatives, N,N-disalicylidene-1,2-diaminopropane, and mixtures thereof.

11. The composition of claim 1 further comprising a corrosion inhibitor selected from the group consisting of dodeceyl succinic acid, amine phosphate, oleoyl sarcosine, imidazole derivatives and substituted sulphonates.

12. The composition of claim 1 further comprising a multifunctional additive.

13. The composition of claim 12 wherein said multifunctional additive comprises zinc dialkyldithiophosphate.

14. The composition of claim 1 further comprising, triazole, benzotriazole, 2-mercaptobenzotriazole, tolutriazole, tolutriazole derivatives, and mixtures thereof.

15. A method for stabilizing a composition comprising iodotrifluoromethane, said method comprising adding an effective amount of a stabilizer comprising at least one compound selected from the group consisting of aryl alkyl ethers, thiols, lactones, thioethers, nitromethane, alkylsilanes, benzophenone derivatives, divinyl terephthalic acid, diphenyl terephthalic acid, and mixtures thereof to the composition comprising iodotrifluoromethane.

16. A process for producing cooling comprising condensing the composition of claim 1 and thereafter evaporating said composition in the vicinity of a body to be cooled.

17. A process for producing heat comprising condensing the composition of claim 1 in the vicinity of a body to be heated, and thereafter evaporating said composition.

18. A method for reducing degradation of a composition comprising iodotrifluoromethane, wherein said degradation is caused by the presence of inadvertent air in a refrigeration, air-conditioning or heat pump system, said method comprising adding at least one stabilizer selected from the group consisting of aryl alkyl ethers, thiols, lactones, thioethers, nitromethane, alkylsilanes, benzophenone derivatives, divinyl terephthalic acid, diphenyl terephthalic acid, and mixtures thereof to the composition comprising iodotrifluoromethane.

19. A composition comprising:
iodotrifluoromethane; and
a stabilizer comprising at least ionic liquid and at least one additional stabilizer selected from the group consisting of phosphites, thiophosphates, dialkylthiophosphate esters, butylated triphenylphosphorothionates, epoxides, fluorinated epoxides, oxetanes, lactones, divinyl terephthalic acid, diphenyl terephthalic acid, phosphorous acid, bis(2,4-bis(1,1-dimethylethyl)-6-methylphenol)ethyl ether, and mixtures thereof.

* * * * *